United States Patent
Homma et al.

(12)

(10) Patent No.: US 6,284,036 B1
(45) Date of Patent: Sep. 4, 2001

(54) HEAT STABLE, PIGMENTED SINTERED MATERIAL COMPRISING A BORIDE, CARBIDE, SILICIDE, NITRIDE OR PHOSPHIDE

(75) Inventors: Seiji Homma, Kobe (JP); Hans-Thomas Schacht, Rheinfelden (DE); Zhimin Hao, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/436,278

(22) Filed: Nov. 8, 1999

(30) Foreign Application Priority Data

| Apr. 16, 1999 | (CH) | 0702/99 |
| May 28, 1999 | (EP) | 99810467 |
| Sep. 24, 1999 | (CH) | 1755/99 |

(51) Int. Cl.[7] .............. C08K 5/00; C09B 48/00; C09B 67/52; C09B 27/00
(52) U.S. Cl. ............ 106/493; 106/494; 106/495; 106/496; 106/497; 106/498; 501/80
(58) Field of Search .................... 106/493, 494, 106/495, 496, 497, 498, 410; 501/80

(56) References Cited

U.S. PATENT DOCUMENTS

| 4,750,909 | 6/1988 | Streck | 8/523 |
| 5,344,486 | 9/1994 | Mainz | 106/415 |
| 5,595,589 | * 1/1997 | Hoshiba et al. | 106/19 B |
| 5,733,482 | 3/1998 | Hoshiba | 264/29.1 |

FOREIGN PATENT DOCUMENTS

| 4302411 | 8/1993 | (DE) . |
| 98/58027 | 12/1998 | (WO) . |

OTHER PUBLICATIONS

Derw. Abst. (1995) 1995–110835[15] of JP7034024.

* cited by examiner

Primary Examiner—Elizabeth D. Wood
Assistant Examiner—Michael DiVerdi
(74) Attorney, Agent, or Firm—David R. Crichton

(57) ABSTRACT

The present invention relates to a process for pigmenting a porous sintered material comprising boride, carbide, silicide, nitride or phosphide compounds by applying a solution of a soluble pigment derivative to the non-coloured sintered material and regenerating the organic pigment by heating, whereby the organic pigment is deposited into the sintered material's pores, as well as to the new pigmented sintered materials themselves.

9 Claims, No Drawings

HEAT STABLE, PIGMENTED SINTERED MATERIAL COMPRISING A BORIDE, CARBIDE, SILICIDE, NITRIDE OR PHOSPHIDE

The present invention relates to a process for pigmenting a porous sintered material comprising boride, carbide, silicide, nitride or phosphide compounds by applying a solution of a soluble pigment derivative to the non-coloured sintered material and regenerating the organic pigment by heating, whereby the organic pigment is deposited into the sintered material's pores, as well as to the new pigmented sintered materials themselves.

Sintered materials are commonly prepared at extremely high temperatures. Thus, it is not feasible to colour them by adding a colorant before the sintering step, and the only way for colouring them is to soak them with a solution of a dye.

However, this leads to unexpected technical problems with sintered materials comprising boride, carbide, silicide, nitride or phosphide compounds. The color saturation is very weak, and many coloured sintered materials are no more satisfactory heat-stable. When the coloured sintered material is heated to high temperatures, the dye sublimes or apparently reacts with the boride, carbide, silicide, nitride or phosphide compounds, so that it fades while the chemical and mechanical properties of the sintered material itself may be impaired.

It has now been found, that certain soluble compounds can be used for the purpose of pigmenting sintered materials comprising boride, carbide, silicide, nitride or phosphide compounds with surprisingly better results. The pigmented sintered materials have strong, optically uniform colorations with high colour saturation (chroma), fast to weathering, light and wear, which are highly stable to high temperatures, even in the presence of additional chemicals, such as for example humidity, oils or fats.

WO 98/58027 discloses the use of carbamate-functional, soluble chromophores which can be converted to the corresponding pigments by being heated to relatively high temperatures, with the ensuing elimination of the carbamate radicals, for the pigmentation of porous materials in general. However, none of the disclosed materials needs to be heat-stable, and the exemplified material wood is in fact quite heat-sensitive.

The present invention accordingly provides a process for pigmenting a porous sintered material comprising a boride, carbide, silicide, nitride or phosphide compound with an organic pigment by (a) treating said sintered material with a solution or melt of a soluble pigment precursor such that at least part of the pigment precursor enters its pores, and
(b) forming said organic pigment within the pores, through thermal fragmentation of the pigment precursor that has entered the pores of the sintered material in accordance with treatment (a), by means of heating, wherein said soluble pigment precursor is a compound of the formula (I) or a mixture of 2 or more compounds of the formula (I)

$$A(B)_x \qquad (I),$$

in which x is an integer from 1 to 8,
A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

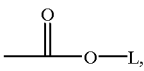

where at least one group B is not hydrogen and, if x is from 2 to 8, the groups B can be identical or different, and
L is any suitable solubilizing group.

Porous sintered materials comprising a boride, carbide, silicide, nitride or phosphide compound are well-known to the skilled artisan as well as the methods and conditions for their preparation. They are also disclosed in numerous patents and in the technical literature, to which express reference is hereby made. Preferred are sintered materials prepared at a temperature of from 250° C. to 1500° C., most preferred at from 400° C. to 1000° C., especially from 400° C. to 800° C.

The boride, carbide, silicide, nitride or phosphide compound may be any boride, carbide, silicide, nitride or phosphide which is sufficiently stable in air saturated with humidity at temperatures from 0 to 50° C., so that its half-life period under such conditions is at least 1 day. Known boride, carbide, silicide, nitride or phosphide compounds are for example the borides of Al, Ca, Ti, V, Cr, Fe, Cu, Sr, Nb, Mo, Ba, Ta, W and Ce, the carbides of B, Si, Ti, V, Fe, Ni, Zr, Nb, Hf, Ta, W and Al, the nitrides of Si, V, Cr, Fe, Ga, Ge, Zr, Nb, Ta, W, Al, Mg and B, phosphorus oxynitride, the silicides of B, Mg, Ca, V, Cr, Mn, Fe, Co, Ni, Cu, Zr, Mo, Ru, Pd and W, and the phosphides of Ti, Cr, Mn, Fe, Co, Ni, Cu, Zr, Mo, Cd, In, W, Pt and Au.

Preferred boride, carbide, silicide, nitride or phosphide compounds are such, which are colourless, white, translucent or only slightly gray coloured, most preferred colourless or white and at least partially translucent.

The porous sintered material may consist of one or more boride, carbide, silicide, nitride or phosphide compounds, or also comprise other materials, such as metallic particles or inorganic particles, for example metal oxides or hydroxides, especially as binders. It may be of any shape and size, for example platelets, tubes, filaments, hollow or massive bodies.

The concentration of the organic pigment may be low or high, depending of the desired colour saturation. A low concentration of the organic pigment in the sintered material leads to pastel tints, while a high concentration leads to higher saturations. Generally, the sintered material to be pigmented by the process of this invention is sufficiently porous for any coloristically desired quantity of soluble pigment precursor to be incorporated.

The skilled artisan will obviously recognize that the instant process may be combined with any other known further treatment. For certain purposes, it is for example possible to improve the pigmented sintered material's long-term stability by sealing or any other finishing treatment known in the field. The instant pigmented sintered materials may be substituted with great coloristic advantages for non-coloured or differently coloured sintered materials. In particular, any additional feature known for the prior art sintered materials may also be used in combination with the instant pigmented sintered materials.

The instant pigmented sintered materials may of course be used for any known purpose, with the only difference that it is pigmented. They are particularly useful wherever colour is essential, for example for distinguishing them or also for purely decorative purposes.

Sintered materials considered as porous are those, which have cavities within their physical shell, which may be partly or totally filled with a gas, for example air, or with a liquid, for example water. Preferably, the pores extend at least in part to the surface of the material. The volume of the pores is preferably at least 5% relative to the volume of the geometric shell of the material. Particularly preferably, the volume of the pores is from 10 to 80% relative to the volume of the geometric shell of the material. Preferably, the cross-section of the pores is so fine that by virtue of capillary force an aqueous liquid does not flow out under gravity. The average cross-section of the pores is particularly preferably from $1 \cdot 10^{-18}$, more preferably from $1 \cdot 10^{-17}$ m$^2$, up to about $10^{-8}$ m$^2$, more preferably up to $4 \cdot 10^{-14}$ m$_2$, most preferred up to $2 \cdot 10^{-15}$ m$^2$, determined at a transverse section through the material, by dividing the total pore area by the number of pores.

Introducing the pigment precursor into the pores of the sintered material is effected by applying a solution or melt of the pigment precursor to the sintered material using any desired, known method, for example by spraying or impregnation in a bath. The application temperature can be an elevated temperature but is judiciously kept low enough for the dissolved or melted pigment precursor not to undergo any, or any significant, decomposition during the minimum time required for the application.

Suitable solvents are water or, preferably, any desired protic or aprotic solvent, examples being hydrocarbons, alcohols, amides, nitriles, nitro compounds, N-heterocycles, ethers, ketones and esters which may also be either mono- or polyunsaturated or chlorinated: examples are methanol, ethanol, isopropanol, n-butanol, benzyl alcohol, diethyl ether, 1-acetoxy-2-ethoxy-ethane, acetone, ethyl methyl ketone, cyclopentanone, butyrolactone, 1-methoxy-2-propanol, 1,2-dimethoxyethane, 1,2-diethoxyethane, 2-methoxyethanol, 2-methoxy-propyl acetate, ethyl acetate, butyl acetate, isopropyllaurate, methyl methacrylate, tetrahydrofuran, dioxane, acetonitrile, benzonitrile, nitrobenzene, N,N-dimethylformamide, N,N-dimethylacetamide, dimethyl sulfoxide, N-methylpyrrolidone, pyridine, picoline, quinoline, dichloromethane, trichloroethane, methylcyclohexane, benzene, toluene, xylene, diisopropylnaphthalene, anisole and chlorobenzene. Further examples of solvents are described in numerous tabular and reference works. Instead of a single solvent it is also possible to employ mixtures of two or more solvents.

Preference is given to those solvents which do not corrode the sintered material that is to be coloured, or do so only very slowly, have a boiling point of between 40° C. and 300° C., and dissolve at least 5 g of the pigment precursor per 100 ml of solvent, especially to aromatic hydrocarbons, alcohols, ethers, ketones and esters. Particular preference is given to toluene, methanol, ethanol, isopropanol, 1,2-dimethoxyethane, 1,2-diethoxyethane, benzyl alcohol, butyrolactone, 1-methoxy-2-propanol, 2-methoxy-propyl acetate, methyl methacrylate, 1-acetoxy-2-ethoxy-ethane, acetone, methyl ethyl ketone, ethyl acetate, tetrahydrofuran and dioxane, and mixtures thereof.

The concentration of the pigment precursor in water or a solvent is usually from 0.01% by weight, based on the weight of the solution, to approximately 99% by weight of the saturation concentration, it also being possible in certain cases to employ supersaturated solutions without premature precipitation of the solvate. For many pigment precursors the optimum concentration is around ~1–50% by weight, often around 10–20% by weight, based on the weight of the solution. For some combinations of pigment precursors and solvents, it may be as high as about 75% by weight.

Conversion of the pigment precursor into the pigmentary form takes place by thermal fragmentation under known conditions, for example in the presence or absence of a catalyst, such as an acid or a cationic photo- or thermoinitiator which can be introduced into the pores of the porous sintered material before, at the same time as or after the pigment precursor.

Although strong acids and bases should not necessarily be avoided, they should only be used in view of the sintered materials' chemical stability toward them. For example, they are no particular limitations for using strong acids and bases or their precursors on a material consisting only of boron carbide, but this is no more the case when the boron carbide particles are hold together with another, less acid-stable boride, carbide, silicide or nitride, such as boron nitride, silicon nitride, gallium nitride, iron boride, iron carbide or cobalt silicide.

The invention is also particularly useful in the case of non perfectly stoichiometric compounds in which the ratio of the elements in the molecule cannot be expressed by a fraction using integers from 1 to 4, for example compounds of formula $X_xY_y$, wherein $x/y=1.37$, because these are in many cases less stable, than perfectly stoichiometric compounds such as $X_3Y_4$.

Fragmentation can be carried out individually, or simultaneously with any further known, subsequent treatment; for example, in the course of sealing or drying the sintered material.

Judicious fragmentable pigment precursors are those whose structure includes a complete pigment framework substituted by an oxycarbonyl radical on at least one heteroatom N, O or S. Where the heteroatom is part of the chromophore or bonded directly to the chromophore, in the course of fragmentation the oxycarbonyl radical is generally eliminated and replaced by a hydrogen atom, so that the structure of the resulting pigment corresponds to that of the unsubstituted pigment framework. Where, on the other hand, the heteroatom is bonded to a substituent of the chromophore, then the fragmentation process is sometimes more complex, and the precise structure of the resulting pigment cannot always be clearly ascertained.

The pigment precursors can be employed individually or else in mixtures with other pigment precursors or with colourants—for example, dyes customarily used for the corresponding application. Where the pigment precursors are employed in mixtures, the components of the mixture are preferably those whose colour in the pigmentary form is red, violet, yellow, blue, green, brown or black. Where the pigment precursors are employed in mixtures, the components of the mixture are preferably those whose colour in the pigmentary form is red, violet, yellow, blue or green. Any dyes added are likewise preferably red, violet, yellow, blue or green. It is however preferred not to use dyes as this generally decreases the light stability.

A preferably contains at least one directly adjacent or conjugated carbonyl group at each heteroatom attached to x groups B.

A is the radical of known chromophores having the basic structure
$A(H)_x$,
Examples Being
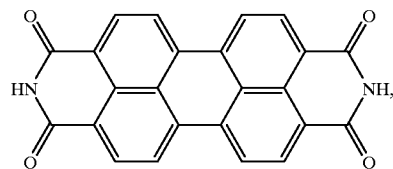
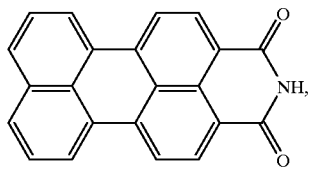
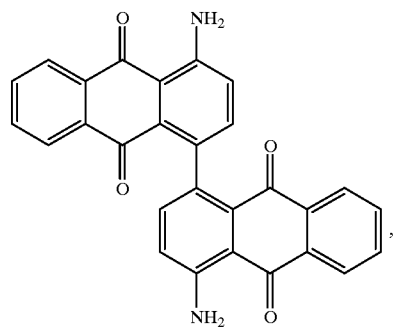
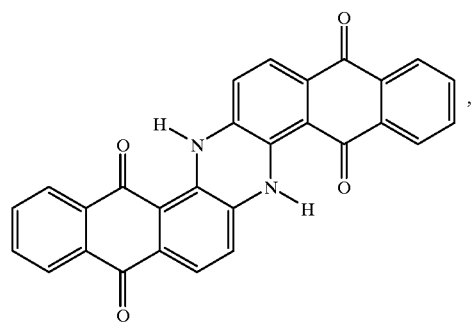
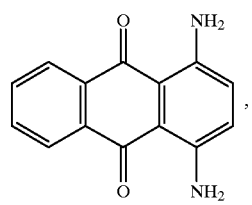
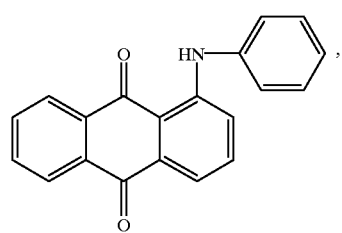
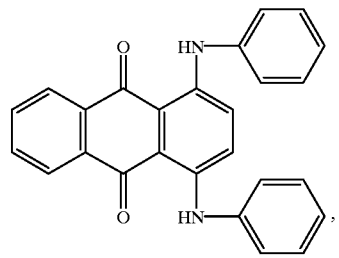
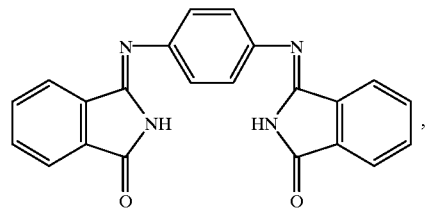
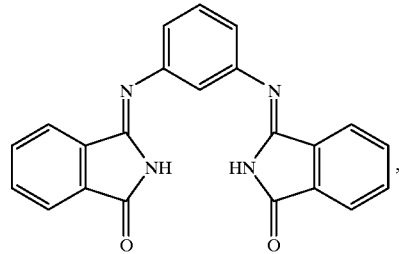
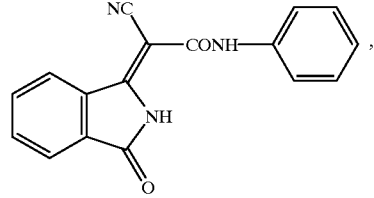
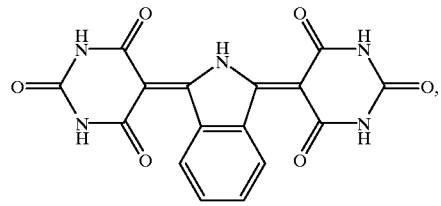
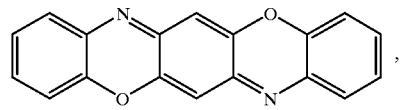

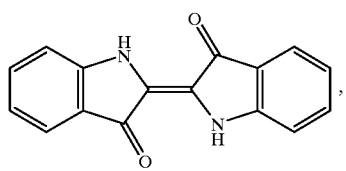
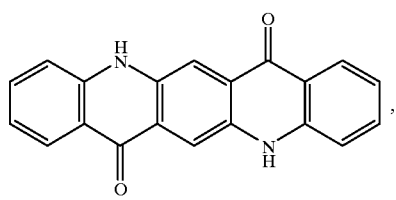
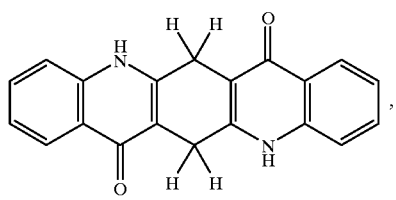
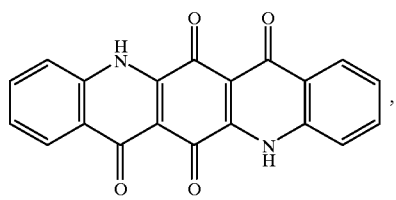
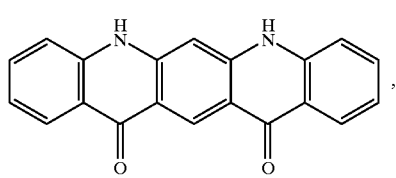
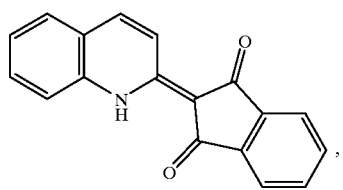
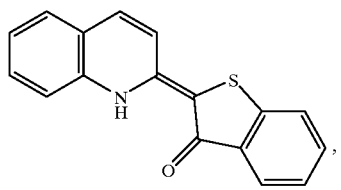
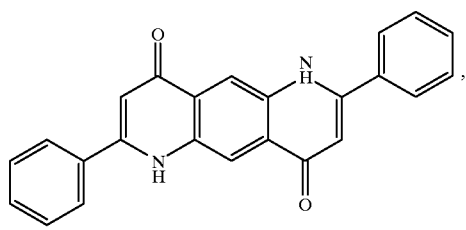
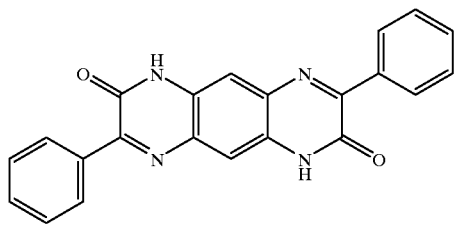
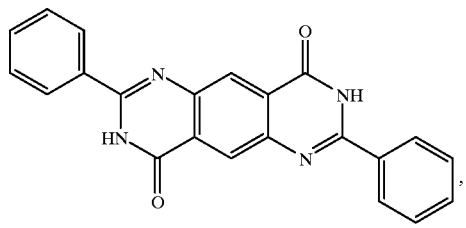
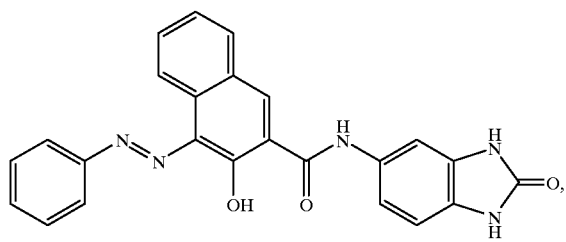
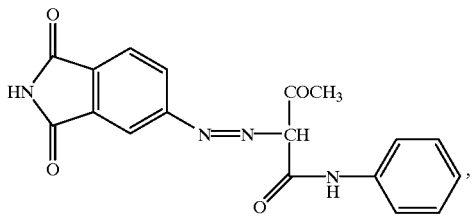
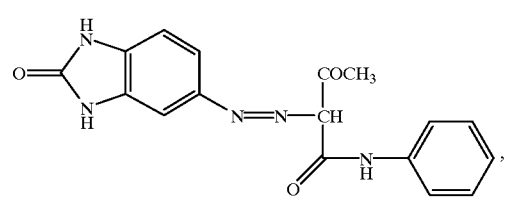
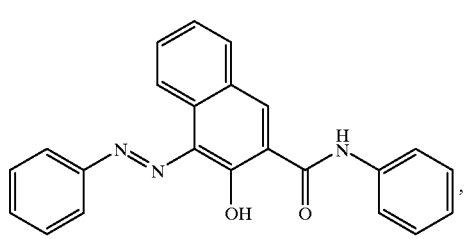

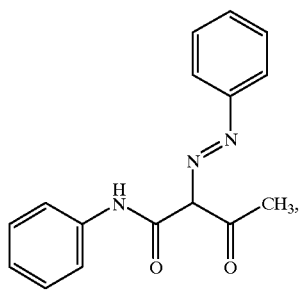
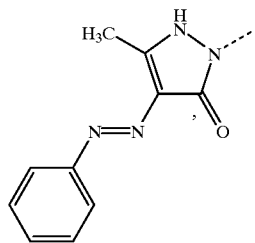
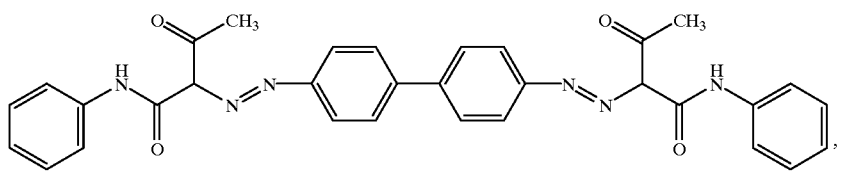
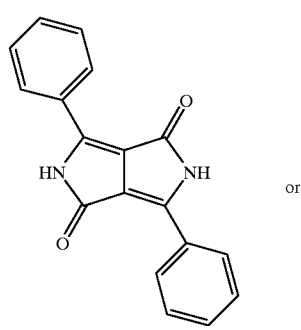 or 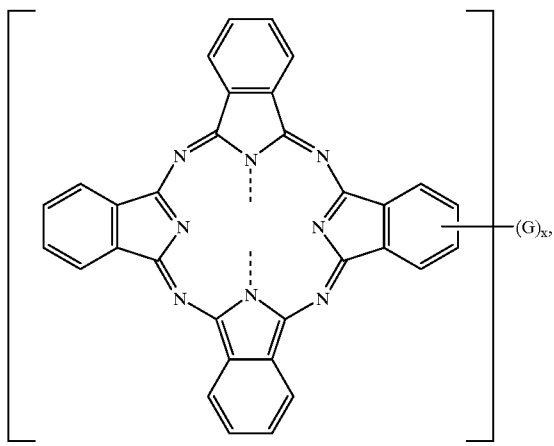
wherein G is a group having at least a NH or OH moiety and x is a number from 1 to 16, and all known derivatives thereof.
Preferred compounds of the formula I are:
a) perylenecarboximides of the formula
(IIa)
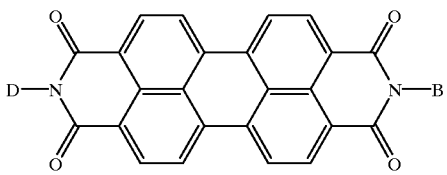
-continued
(IIb)
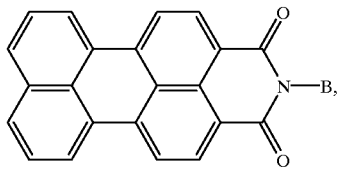
in which D is hydrogen, $C_1$–$C_6$alkyl, unsubstituted or halo- or $C_1$–$C_6$alkyl-substituted phenyl, benzyl or phenethyl or B, b) quinacridones of the formula

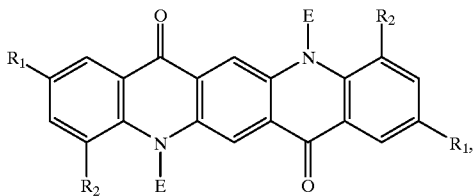
(III)

in which $R_1$ and $R_2$ independently of one another are hydrogen, halogen, $C_1$–$C_{24}$alkyl, $C_1$–$C_6$alkoxy or phenyl, c) dioxazines of the formula

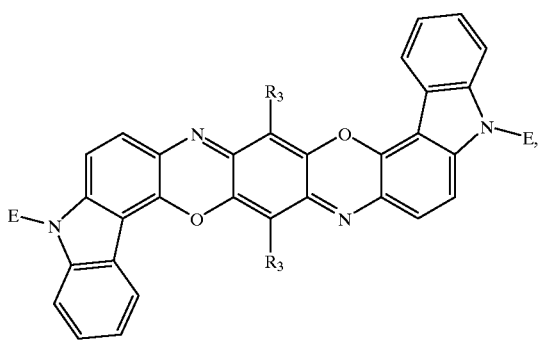
(IV)

in which $R_3$ is hydrogen, halogen or $C_1$–$C_{24}$alkyl, or of the formula

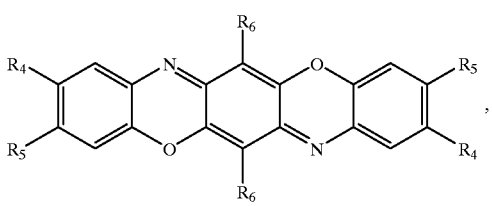
(IVa)

in which $R_4$, $R_5$ and $R_6$ independently of one another are hydrogen, $C_1$–$C_4$alkyl, $C_1$–$C_4$alkoxy, NECO$C_1$–$C_4$alkyl, NECOphenyl or N(E)$_2$ where at least one of the radicals $R_4$, $R_5$ and $R_6$ is NECO$C_1$–$C_4$alkyl, NECOphenyl or N(E)$_2$, d) isoindolines of the formulae

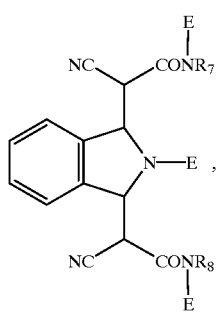
(V)

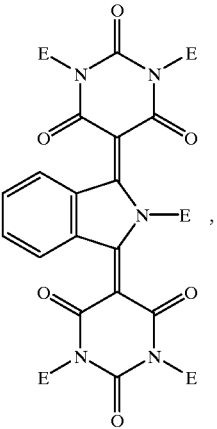
(VI)

or

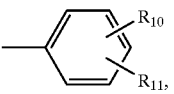 (VII)

in which $R_7$ is a group

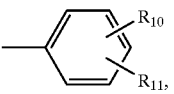

$R_8$ is hydrogen, $C_1$–$C_{24}$alkyl, benzyl or a group

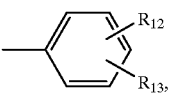

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, e) isoindolinones of the formula (IXa)

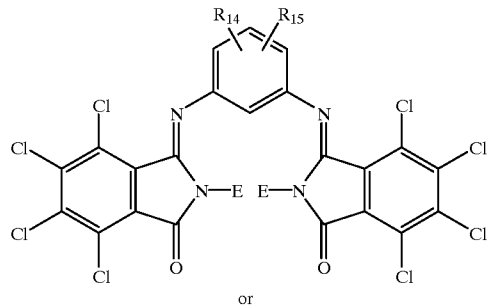

or (IXb)

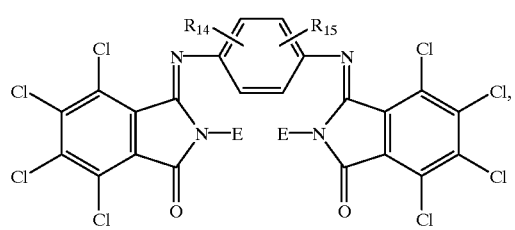

in which $R_{14}$ and $R_{15}$ independently of one another are hydrogen, halogen or $C_1$–$C_4$alkyl, f) anthraquinonoid compounds of the formula (X)

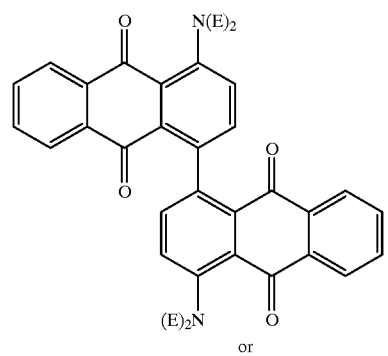

or (XI)

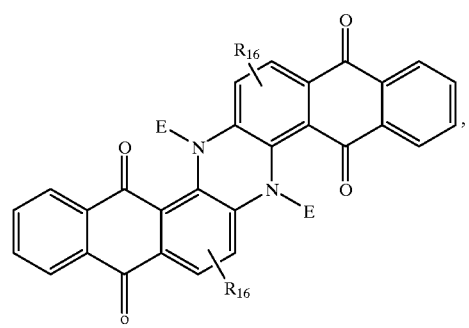

in which $R_{16}$ is hydrogen or halogen, g) phthalocyanines of the formula (XII)

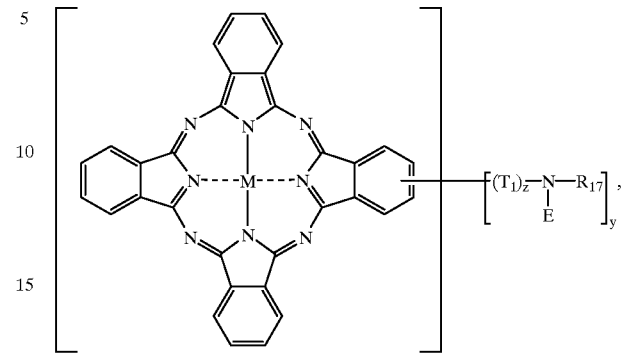

in which

M is $H_2$, a divalent metal selected from the group consisting of Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group consisting of V(O), Mn(O) and TiO, $T_1$ is a direct bond, —$CHR_{18}$—, —CO— or —$SO_2$—, $R_{17}$ is hydrogen, $C_1$–$C_6$alkyl, $C_1$–$C_6$alkylen-O—E, —N(E)$R_{18}$, —N(E)$_2$, —N(E)CO$R_{19}$, —COR$_{19}$,

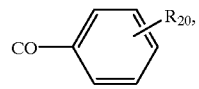

or —N=C(COCH$_3$)—CONH

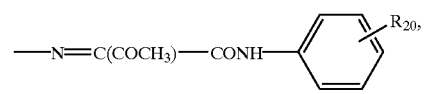

$R_{18}$ is hydrogen or $C_1$–$C_6$alkyl, $R_{19}$ is $C_1$–$C_6$alkyl and $R_{20}$ is hydrogen, halogen, nitro, $C_1$–$C_6$alkyl or $C_1$–$C_6$alkoxy, z is zero or 1 and y is a number from 1 to 8, h) pyrrolo[3,4-c]pyrroles of the formula (XIIIa)

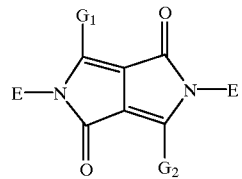

or

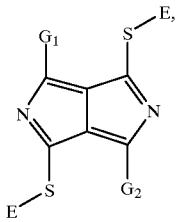
(XIIIb)

in which $G_1$ and $G_2$ independently of one another are a group of the formula

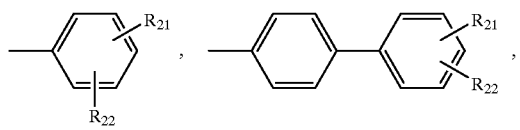

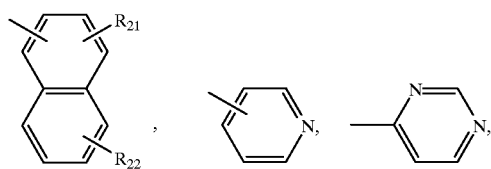

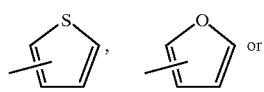

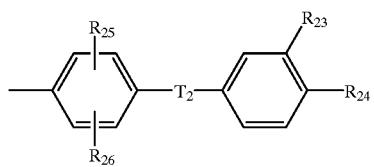

in which $R_{21}$ and $R_{22}$ independently of one another are hydrogen, halogen, $C_1$–$C_{24}$alkyl, $C_1$–$C_6$alkoxy, $C_1$–$C_{18}$alkylthio, $C_1$–$C_{18}$alkylamino, —CN, —NO$_2$, phenyl, trifluoromethyl, $C_5$–$C_6$cycloalkyl, —C=N—($C_1$–$C_{24}$alkyl),

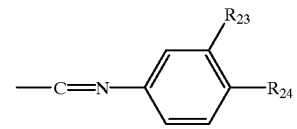

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, $T_2$ is —CH$_2$—, —CH(CH$_3$)—, —C(CH$_3$)$_2$—, —CH=N—, —N=N—, —O—, —S—, —SO—, —SO$_2$— or —NR$_{27}$—, $R_{23}$ and $R_{24}$ independently of one another are hydrogen, halogen, $C_1$–$C_6$alkyl, $C_1$–$C_6$alkoxy or —CN, $R_{25}$ and $R_{26}$ independently of one another are hydrogen, halogen or $C_1$–$C_6$alkyl and $R_{27}$ is hydrogen or $C_1$–$C_6$-alkyl, i) quinophthalones of the formula

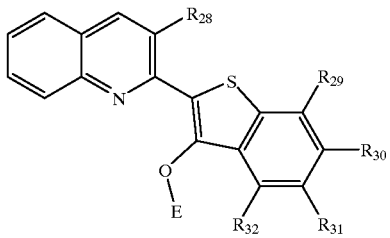
(XIVa)

or

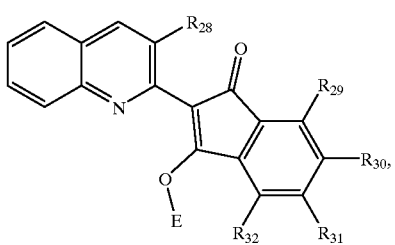
(XIVb)

in which $R_{28}$ is H or O—E, $R_{29}$, $R_{30}$, $R_3$, and $R_{32}$ independently of one another are hydrogen, halogen, —COO—$C_1$–$C_6$alkyl or —CONE-$C_1$–$C_6$alkyl, j) azo compounds of the formula
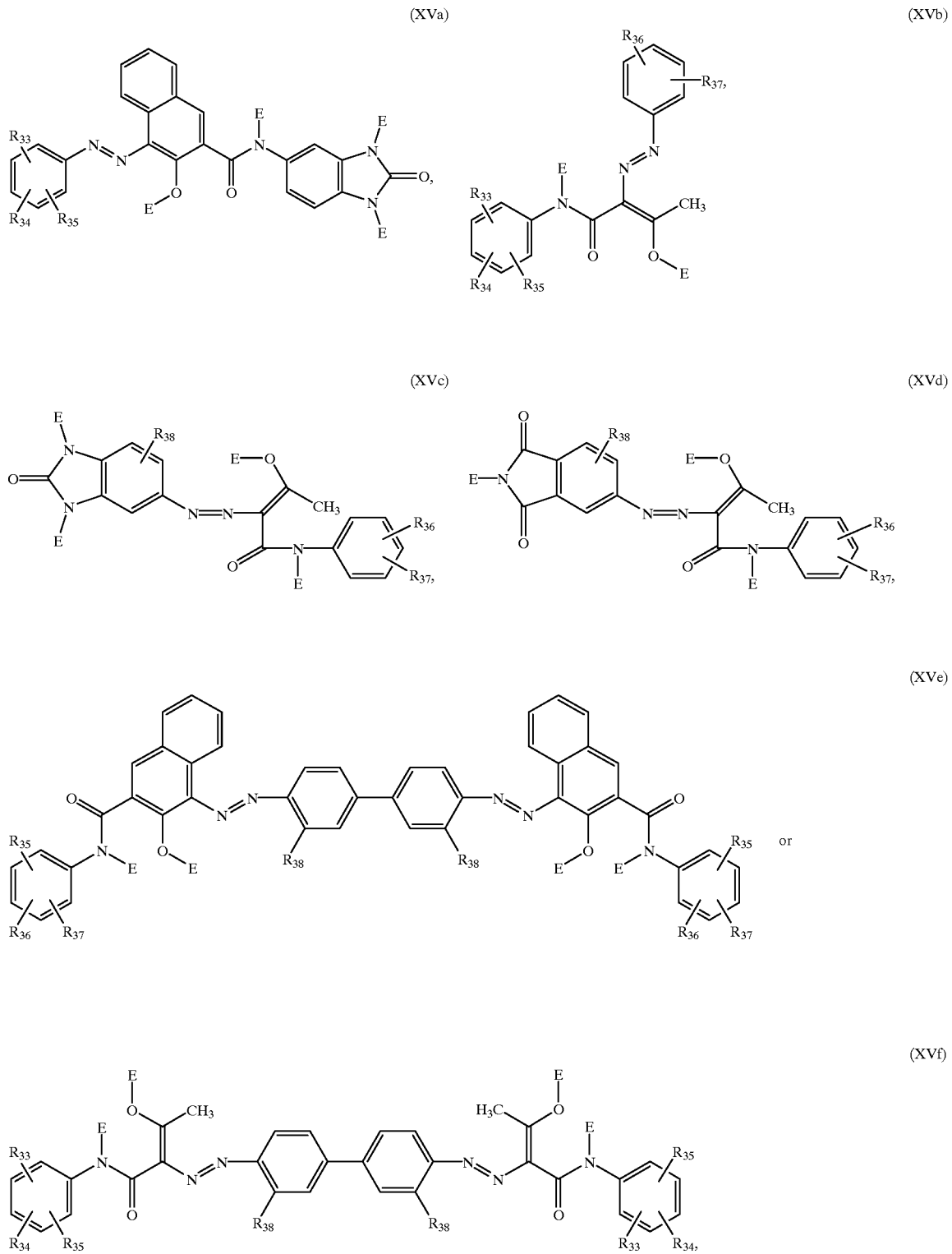
in which $R_{33}$, $R_{34}$, $R_{35}$, $R_{36}$ and $R_{37}$ independently of one another are hydrogen, halogen, $C_1$–$C_6$alkyl, $C_1$–$C_6$alkoxy, nitro, acetyl or $SO_2NEC_1$–$C_6$alkyl, and $R_{38}$ is hydrogen, halogen, $C_1$–$C_6$alkyl or $C_1$–$C_6$alkoxy, k) anthraquinones of the formula

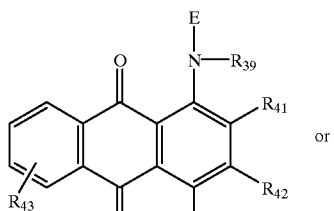
(XVIa)

or

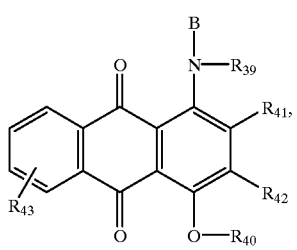
(XVIb)

in which $R_{39}$ and $R_{40}$ independently of one another are hydrogen, $C_1$–$C_{12}$alkyl, or $C_6$–$C_{12}$aryl which is unsubstituted or substituted by halogen, $C_1$–$C_6$alkyl, $C_1$–$C_6$alkoxy, nitro, acetyl, $SO_2NEC_1$–$C_6$alkyl or $SO_2NE_2$, $R_{41}$ and $R_{42}$ independently of one another are hydrogen, halogen, $C_1$–$C_6$alkyl, $C_1$–$C_6$alkoxy, nitro, cyano, $CONE_2$, $SO_2NEC_1$–$C_6$alkyl, $SO_2NE_2$, $SO_3E$, $SO_3Na$ or $C_6$–$C_{12}$aryl which is unsubstituted or substituted by halogen, $C_1$–$C_6$alkyl, $C_1$–$C_6$alkoxy, nitro, acetyl, $SO_2NEC_1$–$C_6$alkyl or $SO_2NE_2$, and $R_{43}$ is hydrogen, halogen, nitro, cyano, hydroxyl or $C_1$–$C_6$alkoxy, and l) indigo or leucoindigo derivatives of the formula

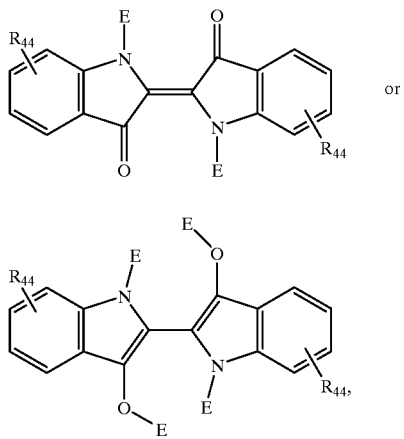
(VIIIa)

or (VIIIb)

in which $R_{44}$ is hydrogen, CN, $C_1$–$C_6$alkyl, $C_1$–$C_6$alkoxy or halogen, where in each case in the above-mentioned formulae each E independently of the others is hydrogen or B, with the proviso that in each formula E is B on at least one occasion, and B is as defined above.

Preferred quinacridones are those, wherein in formula III $R_1$ and $R_2$ independently of one another are hydrogen, chlorine or methyl.

Preferred pyrrolo[3,4-c]pyrroles are those, wherein in formula XIII $G_1$ and $G_2$ are identical and are a group of the formula

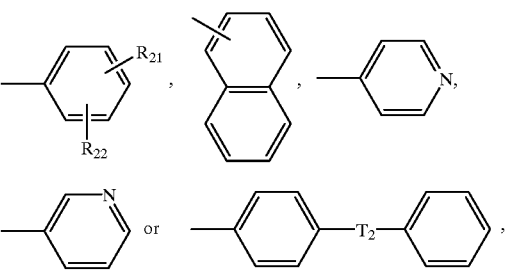

where $R_{21}$ and $R_{22}$ independently of one another are hydrogen, chlorine, bromine, $C_1$–$C_4$alkyl, $C_1$–$C_6$alkoxy, $C_1$–$C_6$alkylamino, CN or phenyl, $T_2$ is —O—, —$NR_{27}$—, —N=N— or —$SO_2$—, and $R_{27}$ is hydrogen, methyl or ethyl.

Preferred azo compounds are those, wherein in the formulae XVa to XVf $R_{33}$, $R_{34}$, $R_{35}$, $R_{36}$ and $R_{37}$ independently of one another are hydrogen, halogen, methyl, methoxy, nitro, acetyl or $SO_2NECH_3$, and $R_{38}$ is halogen or methoxy.

Particularly preferred are quinacridones of the formula

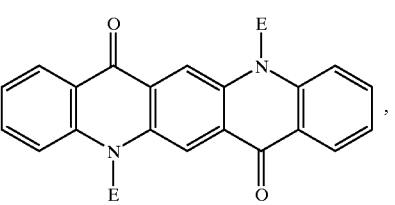
(XVII)

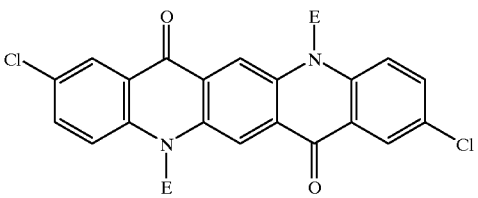
(XVIIIa)

or

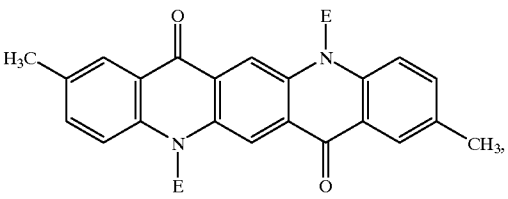
(XVIIIb)

in which E is hydrogen or B, with the proviso that in each formula E is B on at least one occasion, and B is as defined above, dioxazines of the formula

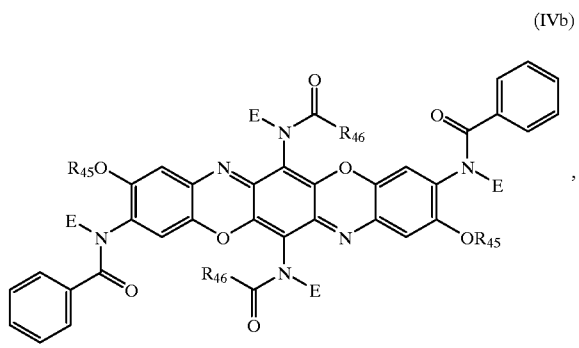

in which $R_{45}$ and $R_{46}$ independently of one another are $C_1$–$C_4$alkyl, and E is hydrogen or B, with the proviso that E is B on at least one occasion, and B is as defined above, pyrrolopyrroles of the formula

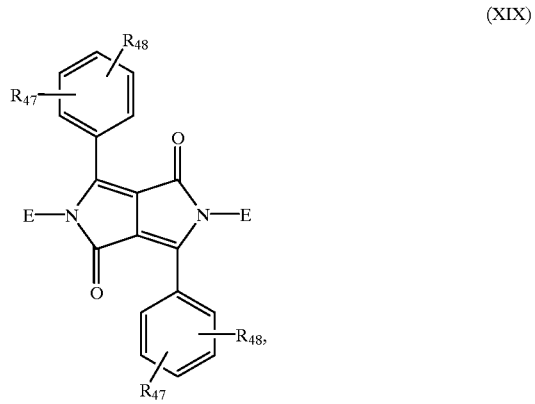

in which $R_{47}$ and $R_{48}$ independently of one another are hydrogen, methyl, tert-butyl, chlorine, bromine, CN or phenyl, and E is hydrogen or B, with the proviso that E is B on at least one occasion, and B is as defined above, phthalocyanines of the formula (XII) in which M is Cu(II) and $R_{16}$ is hydrogen or E, and z is 1 and y is a number from 1 to 4, with the proviso that E is B on at least one occasion, and B is as defined above, isoindolinones of the formula

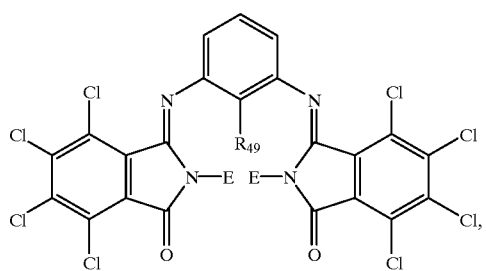

in which $R_{49}$ is hydrogen or $C_1$–$C_4$alkyl, and E is hydrogen or B, with the proviso that E is B on at least one occasion, and B is as defined above, indanthrones of the formula

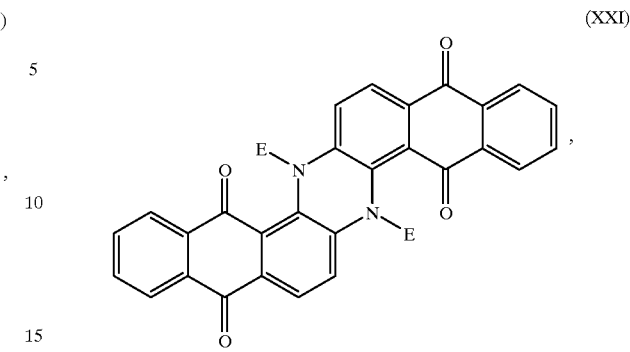

in which E is hydrogen or B, with the proviso that E is B on at least one occasion, and B is as defined above, and azo compounds of the formula XVa, XVb, XVe or XVf, in which $R_{33}$, $R_{34}R_{35}$, $R_{36}$ and $R_{37}$ independently of one another are hydrogen, chlorine, methoxy, nitro, acetyl or $SO_2NECH_3$, and $R_{38}$ is halogen or methoxy, with the proviso that in each formula E is B on at least one occasion, and B is as defined above.

Particularly noteworthy soluble chromophores are those which can be prepared from Colour Index Pigment Yellow 13, Pigment Yellow 73, Pigment Yellow 74, Pigment Yellow 83, Pigment Yellow 93, Pigment Yellow 94, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 32, Pigment Violet 37, 3,6-Di(4'-cyano-phenyl)-2,5-dihydro-pyrrolo[3,4-c]pyrrole-1,4-dion, 3,6-Di(3,4-dichloro-phenyl)-2,5-dihydro-pyrrolo[3,4-c]pyrrole-1, 4-dion or 3-Phenyl-6-(4'-tert.-butyl-phenyl)-2,5-dihydro-pyrrolo[3,4-c]pyrrole-1,4-dion.

The compounds of the formulae I to XXI are known or can be prepared in analogy to methods known per se, as described, for example, in EP 648 770, EP 648 817 and EP 742 556.

Preferably, —L is a group of the formula

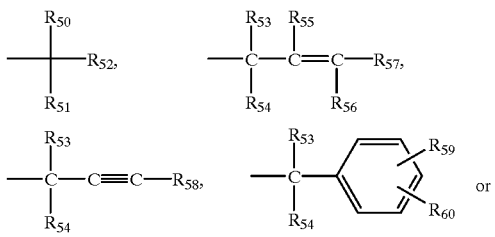

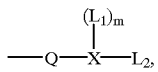

in which $R_{50}$, $R_{51}$ and $R_{52}$ independently of one another are $C_1$–$C_6$alkyl, $R_{53}$ and $R_{54}$ independently of one another are $C_1$–$C_6$alkyl, O, S or $N(R_{61})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{55}$, $R_{56}$ and $R_{57}$ independently of one another are hydrogen or $C_1$–$C_6$alkyl, $R_{58}$ is hydrogen, $C_1$–$C_6$alkyl or a group of the formula

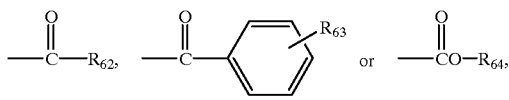

$R_{59}$ and $R_{60}$ independently of one another are hydrogen, $C_1$–$C_6$alkyl, $C_1$–$C_6$alkoxy, halogen, cyano, nitro, $N(R_{61})_2$, unsubstituted or halo-, cyano-, nitro-, $C_1$–$C_6$alkyl- or $C_1$–$C_6$alkoxy-substituted phenyl, $R_{61}$ and $R_{62}$ are $C_1$–$C_6$alkyl, $R_{63}$ is hydrogen or $C_1$–$C_6$alkyl and $R_{64}$ is hydrogen, $C_1$–$C_6$alkyl, unsubstituted or $C_1$–$C_6$alkyl-substituted phenyl, Q is p,q-$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1$–$C_{12}$alkoxy-, —$C_1$–$C_{12}$alkylthio-, —$C_2$–$C_{24}$dialkylamino-, —$C_6$–$C_{12}$aryloxy-, —$C_6$–$C_{12}$arylthio-, —$C_7$–$C_{24}$alkylarylamino- or —$C_{12}$–$C_{24}$diarylamino-substituted $C_1$–$C_6$alkyl or [—(p',q'-$C_2$–$C_6$alkylene)-Z-]$_n$-$C_1$–$C_6$alkyl, where n is a number from 1 to 1000, p' and q' are different numeric locants, each Z independently of the others is a heteroatom O, S or $C_1$–$C_{12}$alkyl-substituted N, and $C_2$–$C_6$alkylene in the repeating units [-$C_2$–$C_6$alkylene-Z-] can be identical or different, and $L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group consisting of halogen, cyano and nitro.

Of particular interest are compounds of the formula (I) in which L is $C_1$–$C_6$alkyl or

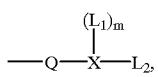

in which Q is $C_2$–$C_4$alkylene and $L_1$ and $L_2$ are [-$C_2$–$C_{12}$alkylene-Z-]$_n$—$C_1$–$C_{12}$alkyl or are $C_1$–$C_{12}$alkyl which is substituted one or more times by $C_1$–$C_{12}$alkoxy, $C_1$–$C_{12}$alkylthio or $C_2$–$C_{24}$dialkylamino, and m and n are as defined above.

Of very particular interest are compounds of the formula (I) in which L is $C_4$–$C_5$alkyl or

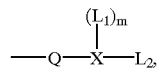

in which Q is $C_2$–$C_4$alkylene, X is O and m is zero, and $L_2$ is [-$C_2$–$C_{12}$alkylene-O-]$_n$—$C_1$–$C_{12}$alkyl or is $C_1$–$C_{12}$alkyl which is substituted one or more times by $C_1$–$C_{12}$alkoxy, especially those in which —Q—X— is a group of the formula —C(CH$_3$)$_2$—CH$_2$—O—.

Most preferred pigment precursors are compounds of the formula (I) in which L is tert-butyl or tert-amyl.

Alkyl or alkylene can be straight-chain, branched, monocyclic or polycyclic.

Thus $C_1$–$C_{12}$alkyl is, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

If $C_2$–$C_{12}$alkyl is mono- or polyunsaturated it is $C_2$–$C_{12}$alkenyl, $C_2$–$C_{12}$alkynyl, $C_2$–$C_{12}$alkapolyenyl or $C_2$–$C_{12}$alkapolyynyl in which two or more double bonds may if appropriate be isolated or conjugated, examples being vinyl, allyl, 2-propen-2-yl, 2-buten-1-yl, 3-buten-1-yl, 1,3-butadien-2-yl, 2-cyclobuten-1-yl, 2-penten-1-yl, 3-penten-2yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl 7,7-dimethyl-2,4-norcaradien-3-yl or the various isomers of hexenyl, octenyl, nonenyl, decenyl or dodecenyl.

$C_2$–$C_4$alkylene is, for example, 1,2-ethylene, 1,2-propylene, 1,3-propylene, 1,2-butylene, 1,3-butylene, 2,3-butylene, 1,4-butylene or 2-methyl-1,2-propylene $C_5$–$C_{12}$alkylene is, for example, an isomer of pentylene, hexylene, octylene, decylene or dodecylene.

$C_1$–$C_{12}$alkoxy is O—$C_1$–$C_{12}$alkyl, preferably O—$C_1$–$C_4$alkyl.

$C_6$–$C_{12}$aryloxy is O—$C_6$–$C_{12}$aryl, for example phenoxy or naphthoxy, preferably phenoxy.

$C_1$–$C_{12}$alkylthio is S—$C_1$–$C_{12}$alkyl, preferably S—$C_1$–$C_4$alkyl.

$C_6$–$C_{12}$arylthio is S—$C_6$–$C_{12}$aryl, for example phenylthio or naphthylthio, preferably phenylthio.

$C_2$–$C_{24}$dialkylamino is N(alkyl$_1$)(alkyl$_2$), where the sum of the carbon atoms in the two groups alkyl$_1$ and alkyl$_2$ is from 2 to 24, preferably N($C_1$–$C_4$alkyl)—$C_1$–$C_4$alkyl.

$C_7$–$C_{24}$alkylarylamino is N(alkyl$_1$)(aryl$_2$), where the sum of the carbon atoms in the two groups alkyl$_1$ and aryl$_2$ is from 7 to 24, for example methylphenylamino, ethylnaphthylamino or butylphenanthrylamino, preferably methylphenylamino or ethylphenylamino.

$C_{12}$–$C_{24}$diarylamino is N(aryl$_1$)(aryl$_2$), where the sum of the carbon atoms in the two groups aryl$_1$ and aryl$_2$ is from 12 to 24, for example diphenylamino or phenyinaphthylamino, preferably diphenylamino.

Halogen is chlorine, bromine, fluorine or iodine, preferably fluorine or chlorine.

n is preferably a number from 1 to 100, with particular preference a number from 2 to 12.

The heating step (b) of the process of this invention can be carried out by any desired means; for example, by treatment in a thermal oven or by electromagnetic radiation, for example IR radiation, or microwaves or induction, in the presence or absence of a catalyst. The conditions required for fragmentation are known per se for each class of pigment precursors. Step (b) is usually accomplished by heating to a temperature of from 100 to 250° C., preferably from 150 to 200° C., particularly preferably from 160 to 200° C., or by providing by other means an amount of energy sufficient for said pigment precursor to be heated to said temperature. The fragmentation temperature may be lowered in known manner by using a catalyst, for example an acid.

The heating time is not critical, as long as care is taken that it is sufficiently long for the fragmentation to be completed. Typically, it ranges from several seconds to several hours, preferably from about 1 to about 30 minutes. The required heating time can be decreased by elevating the temperature or increasing the amount of energy which is provided.

The invention relates also to a porous sintered material comprising a boride, carbide, silicide, nitride or phosphide compound, wherein said sintered material comprises a pigment precursor which is soluble at a concentration of at least 0.01% by weight in an organic solvent and can be fragmented to an organic pigment by means of heating or irradiation.

The invention furthermore also relates to a porous sintered material comprising a boride, carbide, silicide, nitride or phosphide compound, wherein said sintered material comprises an effective pigmenting amount of an organic pigment in its pores.

The examples which follow illustrate the invention without restricting it in any way:

EXAMPLE A1

4.13 g boron nitride, 1.65 g dibutyl phthalate, 0.083 g zinc stearate and 4.13 g of a vinyl polymer are kneaded into a homogeneous mass, then formed into discs of diameter 12 mm and thickness 1 mm. After drying at 180° C. for 15 hours, the furnace is put under nitrogen and the temperature is raised to 1000° C. over the course of 40 hours. After 1 hour, the temperature is then dropped to 700° C. and air is slowly introduced to eliminate any carbon residue, leading to a white porous disc.

The cold disc is dipped into a 20% by weight solution of perhydropolysilazane in xylene for about 20 hours, then put again into a ventilated furnace and heated to 600° C. under nitrogen over the course of 10 hours, and cooled down after 1 hour at 600° C. This process may be repeated once or more times in order to increase the mechanical strength.

EXAMPLE A2

5.00 g boron nitride, 0.30 g magnesium nitride, 1.00 g silicon powder, 1.70 g dioctyl phthalate, 2.00 g polystyrene and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1240° C. over the course of 24 hours. After 24 hours, the temperature is raised to 1450° C. over the course of 4 hours. After 10 more hours, the samples are then cooled to room temperature.

EXAMPLE A3

6.00 g boron nitride, 0.20 g magnesium oxide, 0.60 g silicon powder, 1.60 g polymethylmethacrylate, 1.60 g 1,2-benzenedicarboxylic acid 2-butoxy-2-oxoethyl butyl ester and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1240° C. over the course of 24 hours. After 24 hours, the temperature is raised to 1450° C. over the course of 4 hours. After 10 more hours, the samples are then cooled to room temperature.

EXAMPLE A4

6.50 g boron nitride, 0.20 g iron oxide, 0.20 g calcium oxide, 0.30 g silicon powder, 1.70 g polyethylene, 1.10 g 1,2-benzenedicarboxylic acid 2-butoxyethyl butyl ester and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1240° C. over the course of 24 hours. After 24 hours, the temperature is raised to 1450° C. over the course of 4 hours. After 10 more hours, the samples are then cooled to room temperature.

EXAMPLE A5

5.70 g boron nitride, 0.50 g aluminium carbide, 1.80 g polymethylmethacrylate, 0.20 g dibutylphthalate and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1500° C. After 5 hours, the samples are then cooled to room temperature.

EXAMPLE A6

6.00 g boron nitride, 0.70 g aluminium oxide, 0.10 g carbon black, 0.10 g calcium fluoride, 1.50 g polymethylmethacrylate, 1.60 g 1,2-benzenedicarboxylic acid 2-butoxy-2-oxoethyl butyl ester and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1500° C. After 5 hours, the samples are then cooled to room temperature.

EXAMPLE A7

6.00 g boron nitride, 0.10 g aluminium nitride, 0.40 g bauxite powder, 0,1 g aluminium powder, 2.00 g polyvinylchloride, 0.10 g cryolite, 1.30 g 1,2-benzenedicarboxylic acid 2-butoxy-2-oxoethyl butyl ester and 10.0 g ethylmethylketone are kneaded into a homogeneous mass, then formed into discs of diameter 12 mm and thickness 1 mm. After drying at 300° C. for 10 hours, the furnace is put under nitrogen and the temperature is raised to 1500° C. After 5 hours, the temperature is than dropped to 400° C. and air is introduced to eliminate any carbon residue, The samples are then cooled to room temperature.

EXAMPLES B1–B14

Strengthened white porous discs according to example A1 are dipped each one into a x % by weight solution of a soluble compound in a solvent as shown in the table below. The discs are air-dried at room temperature for 10 minutes, then put into a 200° C. hot oven for 20 minutes. All discs are deeply coloured with a high chroma:

| Ex. | soluble compound | x% | solvent | colour obtained |
|---|---|---|---|---|
| B1 | (3-cyanophenyl-substituted DPP bis-tert-amyloxycarbonyl structure) | 20% | dichloromethane | orange |
| B2a | (4-chlorophenyl-substituted DPP bis-tert-amyloxycarbonyl structure) | 10% | tetrahydrofuran | red |
| B2b | | 5% | o/m/p-xylene | red |
| B2c | | 25% | dichloromethane | red |
| B2d | | 5% | N-methyl-pyrrolidone | red |
| B3a | (phenyl and 4-tert-butylphenyl-substituted DPP bis-tert-butoxycarbonyl structure) | 15% | ethyl methyl ketone | bluish red |
| B3b | | 20% | o/m/p-xylene | bluish red |
| B3c | | 30% | cyclopentaneone | bluish red |
| B3d | | 25% | N-methyl-pyrrolidone | bluish red |

-continued

| Ex. | soluble compound | x% | solvent | colour obtained |
|---|---|---|---|---|
| B4a | | 50% | benzyl alcohol | yellow |
| B4b | | 35% | n-butanol | yellow |
| B4c | | 50% | 4-butyrolactone | yellow |
| B4d | | 50% | butyl acetate | yellow |
| B4e | | 40% | isopropyllaurate | yellow |
| B4f | | 50% | ethyl acetate | yellow |
| B4g | | 60% | 1-methoxy-2-propanol | yellow |
| B4h | | 60% | methyl methacrylate | yellow |
| B4i | | 70% | ethyl methyl ketone | yellow |

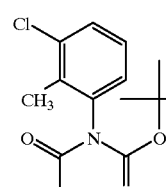

| B5a | | 25% | benzylalcohol | violet |
|---|---|---|---|---|
| B5b | | 2% | 1-butanol | violet |
| B5c | | 20% | cyclopentanone | violet |
| B5d | | 50% | dichloromethane | violet |
| B5e | | 15% | methyl ethyl ketone | violet |
| B5f | | 40% | tetrahydrofuran | violet |

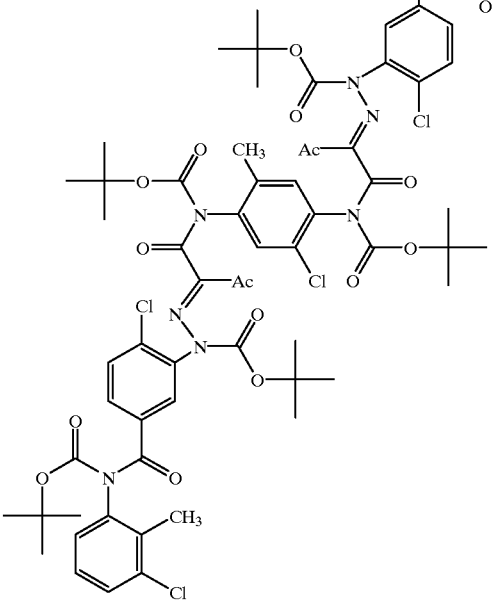

-continued

| Ex. | soluble compound | x% | solvent | colour obtained |
|---|---|---|---|---|
| B6a | [Cu phthalocyanine with SO2N(CO2tBu)CH2CH2OCO2tBu substituents]4 | 5% | ethyl methyl ketone | blue |
| B6b | | 3% | ethyl acetate | blue |
| B6c | | 9% | 1-methoxy-2-propanol | blue |
| B6d | | 30% | methyl methacrylate | blue |
| B7a | mixture of above compounds 3, 4, 5 and 6 (equal weight - each 2.5%) | 10% | cyclopropanone | grey |
| B7b | mixture of above compounds 3, 4, 5 and 6 (equal weight - each 7.5%) | 30% | cyclopropanone | black |
| B8a | [bis-azo naphthalene structure with Boc-carbonate groups and 4-chloro-2-nitrophenyl azo groups] | 30% | 1-methoxy-2-propanol | brown |
| B8b | | 10% | ethyl acetate | brown |
| B9a | [Cu phthalocyanine with acetoacetanilide hydrazone / Boc substituents]4 | 20% | cyclopentanone | green |
| B9b | | 20% | dioxane | green |
| B9c | | 20% | ethyl acetate | green |
| B9d | | 30% | 4-methyl-morpholine | green |
| B9e | | 20% | o-xylene | green |
| B9f | | 10% | 1-methoxy-2-propanol | green |

-continued

| Ex. | soluble compound | x% | solvent | colour obtained |
|---|---|---|---|---|
| B10a | | 20% | n-butanol | yellow |
| B10b | | 20% | cyclopentanone | yellow |
| B10c | | 20% | ethyl acetate | yellow |
| B10d | | 20% | 1-methoxy-2-propanol | yellow |
| B10e | | 20% | ethyl methyl ketone | yellow |
| B10f | | 25% | N-methyl-pyrrolidone | yellow |
| B10g | | 20% | tetrahydrofuran | yellow |
| B10h | | 15% | toluene | yellow |
| B10i | | 15% | o/m/p-xylene | yellow |
| B11a | | 10% | ethyl methyl ketone | magenta |
| B11b | | 10% | 4-butyrolactone | magenta |
| B11c | | 10% | 1-acetoxy-2-ethoxy-ethane | magenta |
| B11d | | 30% | cyclopentanone | magenta |
| B11e | | 40% | dichloromethane | magenta |
| B11f | | 10% | methyl methacrylate | magenta |
| B11g | | 30% | N-methyl-pyrrolidone | magenta |
| B11h | | 10% | 2-methoxy-propyl acetate | magenta |

-continued

| Ex. | soluble compound | x% | solvent | colour obtained |
|---|---|---|---|---|
| B12a | | 10% | cyclopentanone | blue |
| B12b | | 10% | tetrahydrofuran | blue |
| B13a | | 40% | tetrahydrofuran | red |
| B13b | | 25% | o/m/p-xylene | red |
| B13c | | 35% | dichloromethane | red |
| B13d | | 20% | cyclopentanone | red |
| B14a | | 25% | cyclopentanone | blue |
| B14b | | 5% | ethyl acetate | blue |

EXAMPLES B15–B112

The procedure of examples B1–B14 is used, but porous discs according to A2 to A7 are used instead of the porous discs of example A1. The results are in all cases satisfactory.

EXAMPLE C1

The disk according to example B2a to B2d are heated for 24 hours at 200° C. The colour does not change. Their light stability is excellent, and their mechanical strength is pigmented disks according to example A1, too.

What is claimed is:

1. A process for pigmenting a porous sintered material comprising a boride, carbide, silicide, nitride or phosphide compound with an organic pigment by
   (a) treating said sintered material with a solution or melt of a soluble pigment precursor such that at least part of the pigment precursor enters its pores, and
   (b) forming said organic pigment within the pores, through thermal fragmentation of the pigment precursor that has entered the pores of the sintered material in accordance with treatment (a), by means of heating,
wherein said soluble pigment precursor is a compound of the formula (I) or a mixture of 2 or more compounds of the formula (I)

A(B)$_x$ (I), in which x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

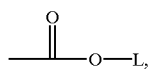

where at least one group B is not hydrogen and, if x is from 2 to 8, the groups B can be identical or different, and L is any suitable solubilizing group.

2. A process according to claim 1, wherein said sintered material is selected from the group consisting of the borides of Al, Ca, Ti, V, Cr, Fe, Cu, Sr, Nb, Mo, Ba, Ta, W and Ce, the carbides of B, Si, Ti, V, Fe, Ni, Zr, Nb, Hf, Ta, W and Al, the nitrides of Si, V, Cr, Fe, Ga, Ge, Zr, Nb, Ta, W, Al, Mg and B, phosphorus oxynitride, the silicides of B, Mg, Ca, V, Cr, Mn, Fe, Co, Ni, Cu, Zr, Mo, Ru, Pd and W, and the phosphides of Ti, Cr, Mn, Fe, Co, Ni, Cu, Zr, Mo, Cd, In, W, Pt and Au.

3. A process according to claim 1 in which A is the radical of a chromophore selected from a) perylenecarboximides of the formula

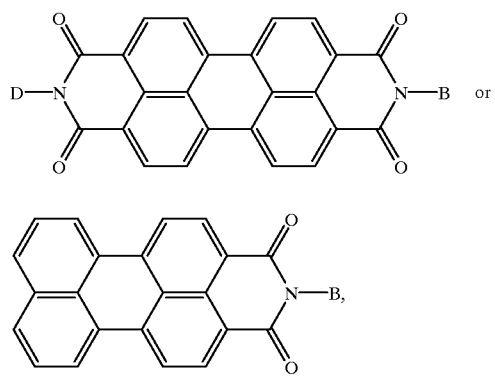

in which D is hydrogen, C$_1$–C$_6$alkyl, unsubstituted or halo- or C$_1$–C$_6$alkyl-substituted phenyl, benzyl or phenethyl or B, b) quinacridones of the formula

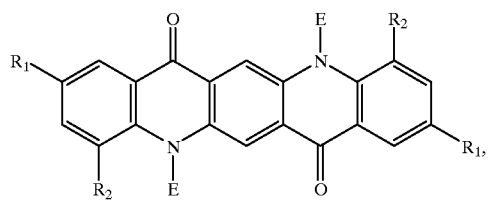

in which R$_1$ and R$_2$ independently of one another are hydrogen, halogen, C$_1$–C$_{24}$alkyl, C$_1$–C$_6$alkoxy or phenyl, c) dioxazines of the formula

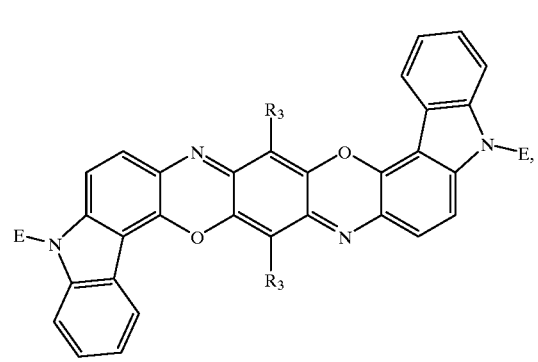

in which R$_3$ is hydrogen, halogen or C$_1$–C$_{24}$alkyl, or of the formula

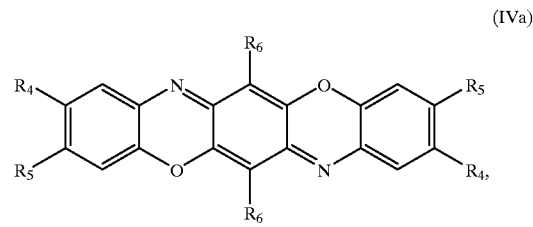

in which R$_4$, R$_5$ and R$_6$ independently of one another are hydrogen, C$_1$–C$_4$alkyl, C$_1$–C$_4$alkoxy, NECOC$_1$–C$_4$alkyl, NECOphenyl or N(E)$_2$ where at least one of the radicals R$_4$, R$_5$ and R$_6$ is NECOC$_1$–C$_4$alkyl, NECOphenyl or N(E)$_2$, d) isoindolines of the formulae

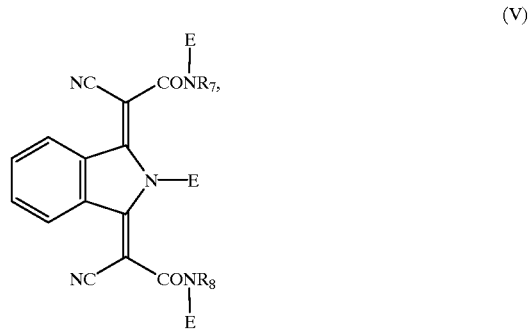

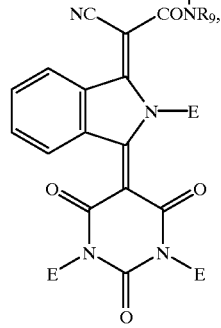

-continued (VII)

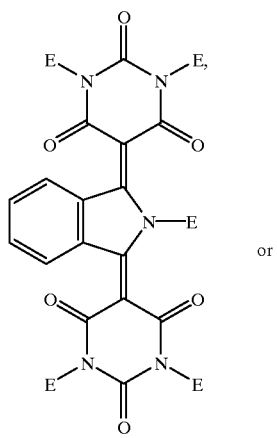

or in which R₇ is a group

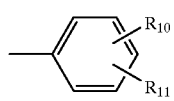

$R_8$ is hydrogen, $C_1$–$C_{24}$alkyl, benzyl or a group

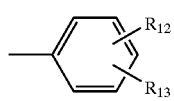

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, e) isoindolinones of the formula (IXa)

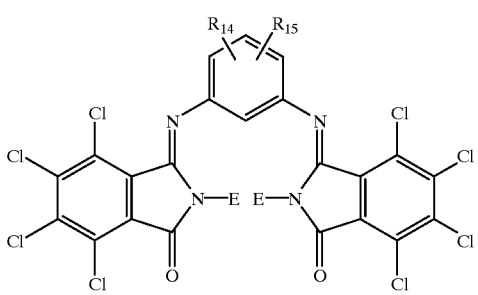

or (IXb)

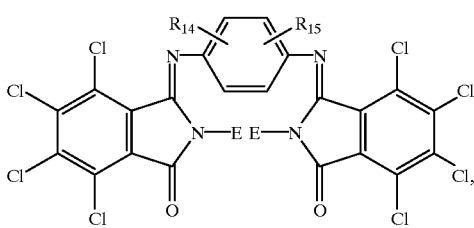

in which $R_{14}$ and $R_{15}$ independently of one another are hydrogen, halogen or $C_1$–$C_4$alkyl, f) anthraquinonoid compounds of the formula (X)

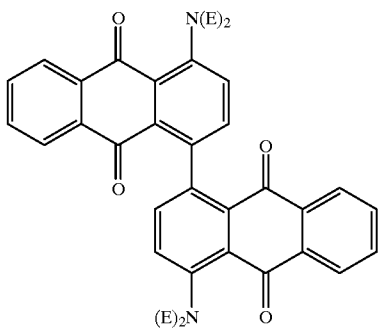

or (XI)

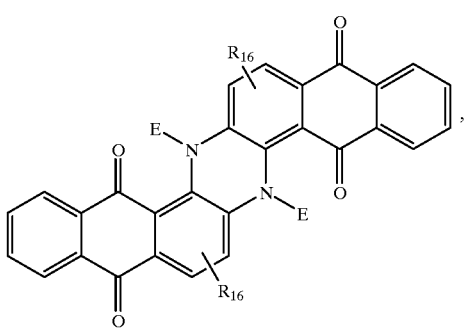

in which $R_{16}$ is hydrogen or halogen, g) phthalocyanines of the formula (XII)

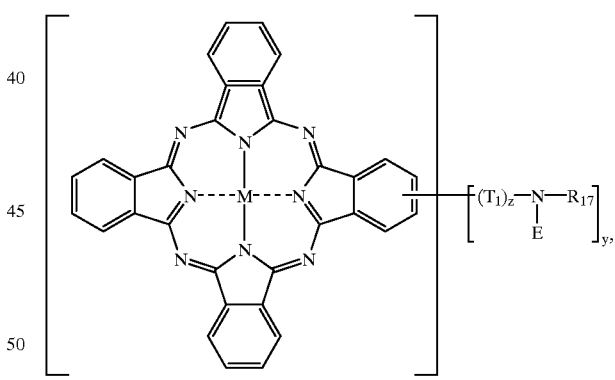

in which

M is $H_2$, a divalent metal selected from the group consisting of Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group consisting of V(O), Mn(O) and TiO, T1 is a direct bond, —CHR₁₈—, —CO— or —SO₂—, $R_{17}$ is hydrogen, $C_1$–$C_6$alkyl, $C_1$–$C_6$alkylen-O—E, —N(E)R₁₈, —N(E)₂, —N(E)COR₁₉, —COR₁₉,

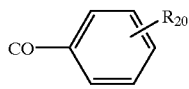

or —N=C(COCH$_3$)—CONH

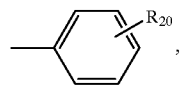,

R$_{18}$ is hydrogen or C$_1$–C$_6$alkyl, R$_{19}$ is C$_1$–C$_6$alkyl and R$_{20}$ is hydrogen, halogen, nitro, C$_1$–C$_6$alkyl or C$_1$–C$_6$alkoxy, z is zero or 1 and y is a number from 1 to 8, h) pyrrolo[3,4-c]pyrroles of the formula

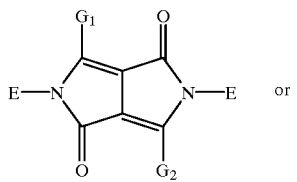 (XIIIa)

or (XIIIb)

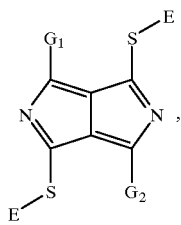, in which G$_1$ and G$_2$ independently of one another are a group of the formula

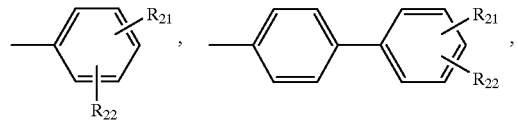

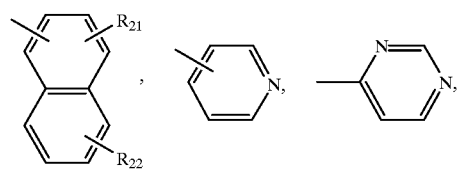

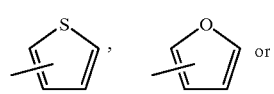 or

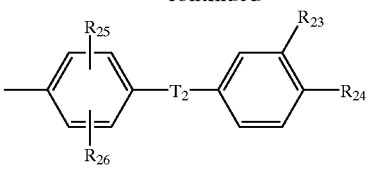

in which

R$_{21}$, and R$_{22}$ independently of one another are hydrogen, halogen, C$_1$–C$_{24}$alkyl, C$_1$–C$_6$alkoxy, C$_1$–C$_{18}$alkylthio, C$_1$–C$_{18}$alkylamino, —CN, —NO$_2$, phenyl, trifluoromethyl, C$_5$–C$_6$cycloalkyl, —C=N—(C$_1$–C$_{24}$alkyl),

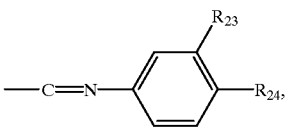, imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, T$_2$ is —CH$_2$—, —CH(CH$_3$)—, —C(CH$_3$)$_2$—, —CH=N—, —N=N—, —O—, —S—, —SO—, —SO$_2$— or —NR$_2$—, R$_{23}$ and R$_{24}$ independently of one another are hydrogen, halogen, C —C alkyl, C —C alkoxy or —CN, R$_2$ and R$_2$ independently of one another are hydrogen, halogen or C —C alkyl and R$_2$ is hydrogen or C —C -alkyl, i) quinophthalones of the formula

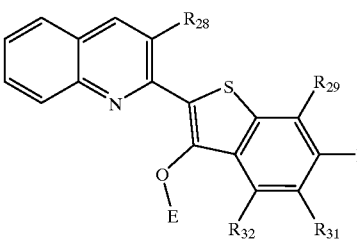 (XIVa)

or

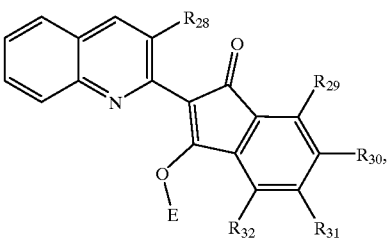 (XIVb)

in which R$_{28}$ is H or O—E,

R$_{29}$, R$_{30}$, R$_3$, and R$_{32}$ independently of one another are hydrogen, halogen, —COO—C$_1$–C$_6$alkyl or —CONE—C$_1$–C$_6$alkyl, j) azo compounds of the formula

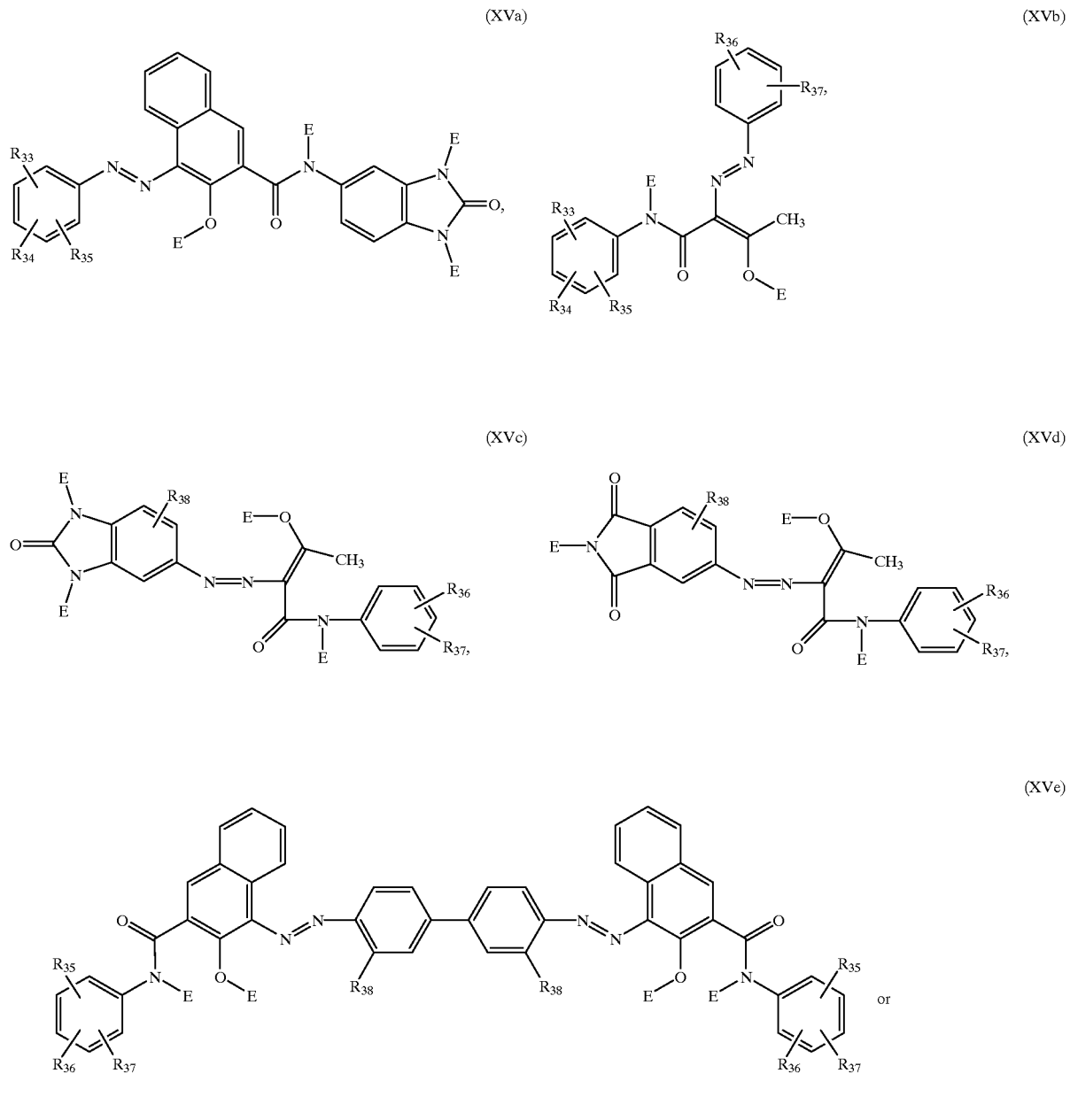
in which $R_{33}$, $R_{34}$, $R_{35}$, $R_{36}$ and $R_{37}$ independently of one another are hydrogen, halogen, $C_1$–$C_6$alkyl, $C_1$–$C_6$alkoxy, nitro, acetyl or $SO_2NEC_1$–$C_6$alkyl, and $R_{38}$ is hydrogen, halogen, $C_1$–$C_6$alkyl or $C_1$–$C_6$alkoxy,
k) anthraquinones of the formula

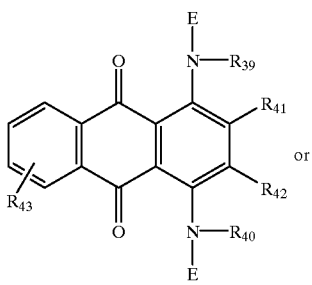

(XVIa)

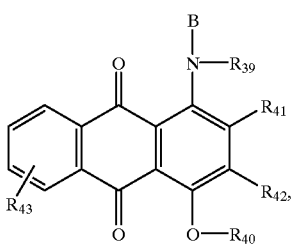

(XVIb)

in which $R_{39}$ and $R_{40}$ independently of one another are hydrogen, $C_1$–$C_{12}$alkyl, or $C_6$–$C_{12}$aryl which is unsubstituted or substituted by halogen, $C_1$–$C_6$alkyl, $C_1$–$C_6$alkoxy, nitro, acetyl, $SO_2NEC_1$–$C_6$alkyl or $SO_2NE_2$, $R_{41}$, and $R_{42}$ independently of one another are hydrogen, halogen, $C_1$–$C_6$alkyl, $C_1$–$C_6$alkoxy, nitro, cyano, $CONE_2$, $SO_2NEC_1$–$C_6$alkyl, $SO_2NE_2$, $SO_3E$, $SO_3Na$ or $C_6$–$C_{12}$aryl which is unsubstituted or substituted by halogen, $C_1$–$C_6$alkyl, $C_1$–$C_6$alkoxy, nitro, acetyl, $SO_2NEC_1$–$C_6$alkyl or $SO_2NE_2$, and $R_{43}$ is hydrogen, halogen, nitro, cyano, hydroxyl or $C_1$–$C_6$alkoxy, and l) indigo or leucoindigo derivatives of the formula

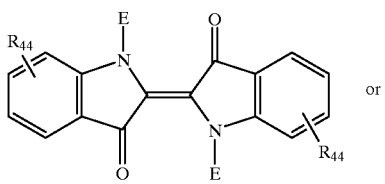

(VIIIa)

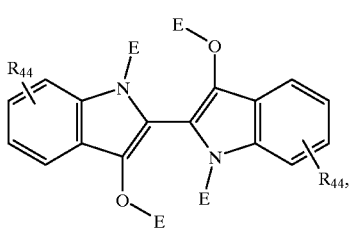

(VIIIb)

in which $R_{44}$ is hydrogen, CN, $C_1$–$C_6$alkyl, $C_1$–$C_6$alkoxy or halogen,
where in each case in the above-mentioned formulae each E independently of the others is hydrogen or B, with the proviso that in each formula E is B on at least one occasion, and B is as defined above.

4. A process according to claim 1 in which —L is a group of the formula

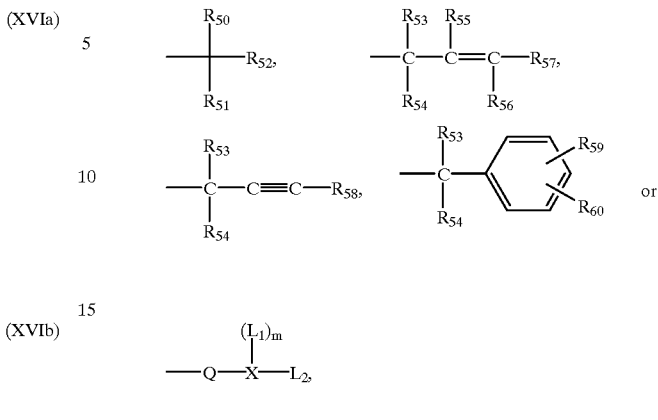

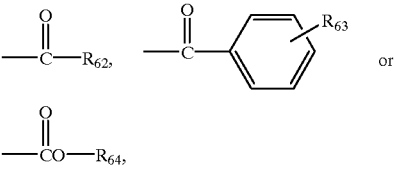

in which $R_{50}$, $R_{51}$ and $R_{52}$ independently of one another are $C_1$–$C_6$alkyl, $R_{53}$ and $R_{54}$ independently of one another are $C_1$–$C_6$alkyl, O, S or $N(R_{61})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{55}$, $R_{56}$ and $R_{57}$ independently of one another are hydrogen or $C_1$–$C_6$alkyl, $R_{58}$ is hydrogen, $C_1$–$C_6$alkyl or a group of the formula $R_{59}$ and $R_{60}$ independently of one another are hydrogen, $C_1$–$C_6$alkyl, $C_1$–$C_6$alkoxy, halogen, cyano, nitro, $N(R_{61})_2$, unsubstituted or halo-, cyano-, nitro-, $C_1$–$C_6$alkyl- or $C_1$–$C_6$alkoxy-substituted phenyl, $R_{61}$, and $R_{62}$ are $C_1$–$C_6$alkyl, $R_{63}$ is hydrogen or $C_1$–$C_6$alkyl and $R_{64}$ is hydrogen, $C_1$–$C_6$alkyl unsubstituted or $C_1$–$C_6$alkyl-substituted phenyl, Q is p,q-$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1$–$C_{12}$alkoxy-, —$C_1$–$C_{12}$alkylthio-, —$C_2$–$C_{24}$dialkylamino-, —$C_6$–$C_{12}$aryloxy-, —$C_6$–$C_{12}$arylthio-, —$C_7$–$C_{24}$alkylarylamino- or —$C_{12}$–$C_{24}$diarylamino-substituted $C_1$–$C_6$alkyl or (-(p', q'-$C_2$–$C_6$alkylene)-Z-$_n$)—$C_1$–$C_6$alkyl, where n is a number from 1 to 1000, p' and q' are different numeric locants, each Z independently of the others is a heteroatom O, S or $C_1$–$C_{12}$alkyl-substituted N, and $C_2$–$C_6$alkylene in the repeating units (—$C_2$–$C_6$alkylene-Z-) can be identical or different, and $L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group consisting of halogen, cyano and nitro.

5. A porous sintered material comprising a boride, carbide, silicide, nitride or phosphide compound, wherein said sintered material comprises a pigment precursor which is soluble at a concentration of at least 0.01% by weight in an organic solvent and can be fragmented to an organic pigment by means of heating or irradiation.

6. A porous sintered material comprising a boride, carbide, silicide, nitride or phosphide compound, wherein said sintered material comprises a pigment precursor which is soluble at a concentration of at least 0.01% by weight in an organic solvent and can be fragmented to an organic pigment by means of heating or irradiation, wherein said pigment precursor is a compound of the formula (I) or a mixture of 2 or more compounds of the formula (I)

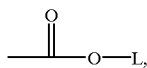  (I), in which x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

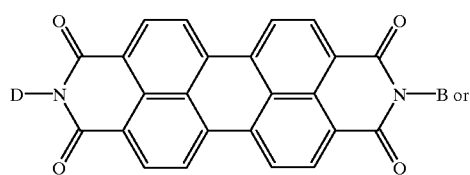

where at least one group B is not hydrogen and, if x is from 2 to 8, the groups B can be identical or different, and L is any suitable solubilizing group.

7. A porous sintered material according to claim 6, wherein said sintered material is selected from the group consisting of the borides of Al, Ca, Ti, V, Cr, Fe, Cu, Sr, Nb, Mo, Ba, Ta, W and Ce, the carbides of B, Si, Ti, V, Fe, Ni, Zr, Nb, Hf, Ta, W and Al, the nitrides of Si, V, Cr, Fe, Ga, Ge, Zr, Nb, Ta, W, Al, Mg and B, phosphorus oxynitride, the silicides of B, Mg, Ca, V, Cr, Mn, Fe, Co, Ni, Cu, Zr, Mo, Ru, Pd and W, and the phosphides of Ti, Cr, Mn, Fe, Co, Ni, Cu, Zr, Mo, Cd, In, W, Pt and Au.

8. A porous sintered material according to claim 6 in which A is the radical of a chromophore selected from a) perylenecarboximides of the formula

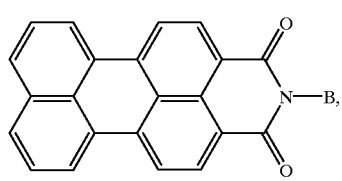

in which D is hydrogen, $C_1$–$C_6$alkyl, unsubstituted or halo- or $C_1$–$C_6$alkyl-substituted phenyl, benzyl or phenethyl or B, b) quinacridones of the formula

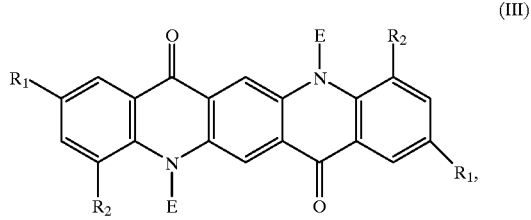

in which $R_1$ and $R_2$ independently of one another are hydrogen, halogen, $C_1$–$C_{24}$alkyl, $C_1$–$C_6$alkoxy or phenyl, c) dioxazines of the formula

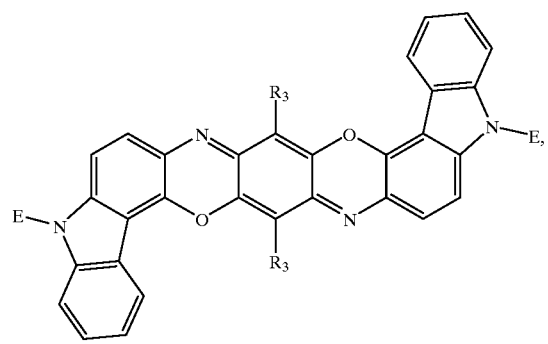

in which $R_3$ is hydrogen, halogen or $C_1$–$C_{24}$alkyl, or of the formula

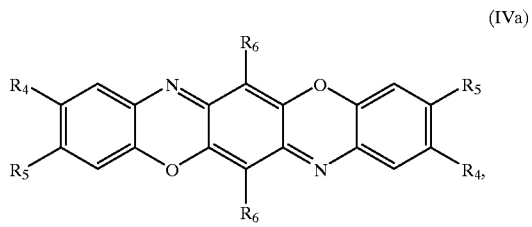

in which $R_4$, $R_5$ and $R_6$ independently of one another are hydrogen, $C_1$–$C_4$alkyl, $C_1$–$C_4$alkoxy, NECOC$_1$–$C_4$alkyl, NECOphenyl or N(E)$_2$ where at least one of the radicals $R_4$, $R_5$ and $R_6$ is NECOC$_1$–$C_4$alkyl, NECOphenyl or N(E)$_2$, d) isoindolines of the formulae

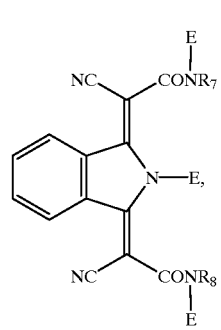

-continued (VI)

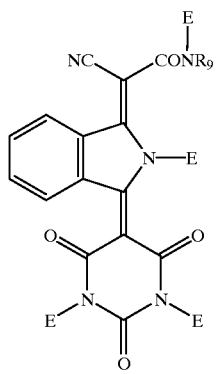

or (VII)

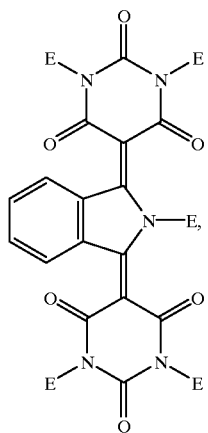

in which $R_7$ is a group

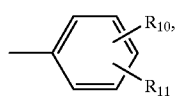

$R_8$ is hydrogen, $C_1$–$C_{24}$alkyl, benzyl or a group

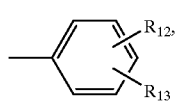

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, e) isoindolinones of the formula (IXa)

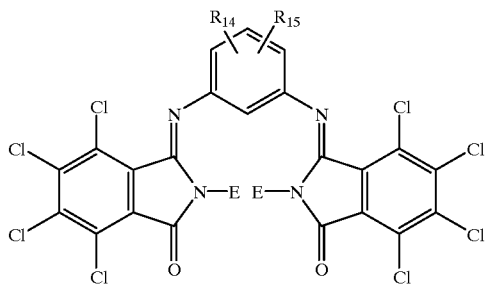

or (IXb)

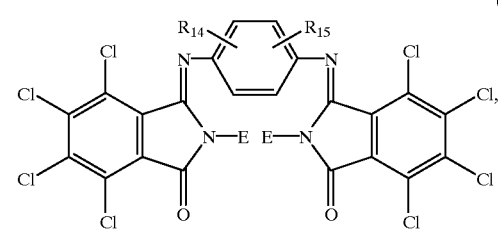

in which $R_{14}$ and $R_{15}$ independently of one another are hydrogen, halogen or $C_1$–$C_4$alkyl, f) anthraquinonoid compounds of the formula (X)

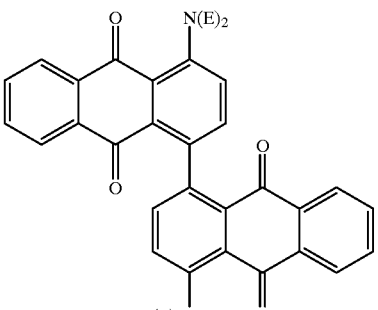

or (XI)

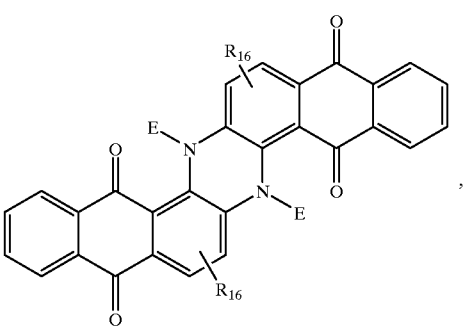

in which $R_{16}$ is hydrogen or halogen, g) phthalocyanines of the formula

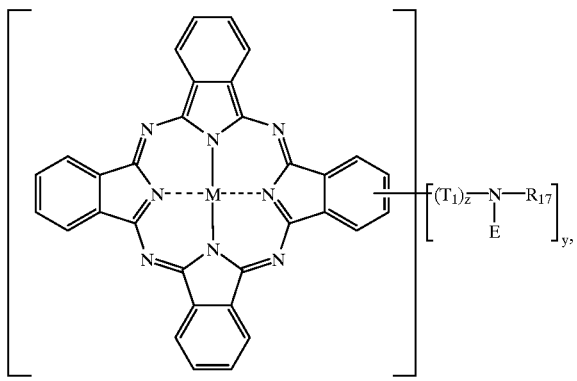

(XII)

in which

M is H$_2$, a sivalent metal selected from the group consisting of Cu(II), Zn(II), Fe(II), Ni(II), Ru(II), Rh(II), Mg(II), Be(II), Ca(II), Ba(II), Cd(II), Hg(II), Sn(II), Co(II) and Pb(II), preferably Cu(II), Pd(II), or a divalent oxo metal selected from the group consisting of V(O), Mn(O) and TiO, T$_1$ is a direct bond, —CHR$_{18}$—, —CO— or —SO—$_2$—, R$_{17}$ is hydrogen, C$_1$–C$_6$alkyl, C$_1$–C$_6$alkylen-O—E, —N(E)R$_{18}$, —N(E)$_2$, —N(E)COR$_{19}$, —COR$_{19}$,

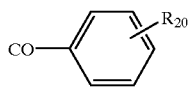

or —N=C(CONH$_3$)—CONH

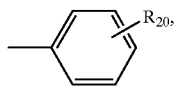

R$_{18}$ is hydrogen or C$_1$–C$_6$alkyl, R$_{19}$ is C$_1$–C$_6$alkyl and

R$_{20}$ is hydrogen, halogen, nitro, C$_1$–C$_6$alkyl or C$_1$–C$_6$alkoxy, z is zero or 1 and y is a number from 1 to 8, h) pyrrolo[3,4-c]pyrroles of the formula

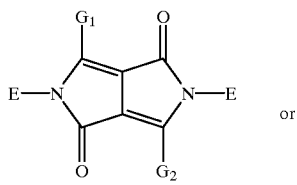

(XIIIa)

or

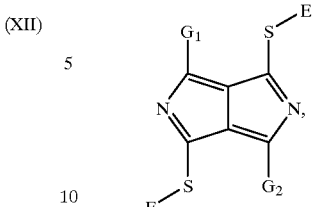

(XIIIb)

in which G$_1$ and G$_2$ independently of one another are a group of the formula

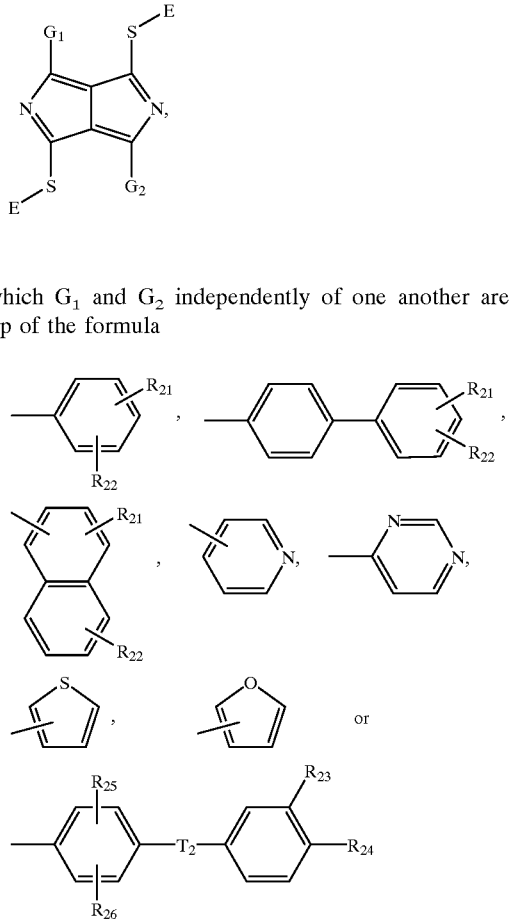

in which

R$_{21}$ and R$_{22}$ independently of one another are hydrogen, halogen, C$_1$–C$_{24}$alkyl, C$_1$–C$_6$alkoxy, C$_1$–C$_{18}$alkylthio, C$_1$–C$_{18}$alkylamino, —CN, —NO$_2$, phenyl, trifluoromethyl, C$_5$–C$_6$cycloalkyl, —C=N—(C$_1$–C$_{24}$alkyl),

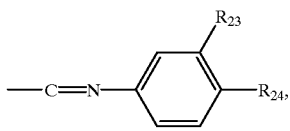

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, T$_2$ is —CH$_2$—, —CH(CH$_3$)—, —C(CH$_3$)$_2$—, —CH=N—, —N=N—, —O—, —S—, —SO—, —SO$_2$— or —NR$_{27}$—, R$_{23}$ and R$_{24}$ independently of one another are hydrogen, halogen, C$_1$–C$_6$alkyl, C$_1$–C$_6$alkoxy or —CN, R$_{25}$ and R$_{26}$ independently of one another are hydrogen, halogen or C$_1$–C$_6$alkyl and R$_{27}$ is hydrogen or C$_1$–C$_6$-alkyl, i) quinophthalones of the formula
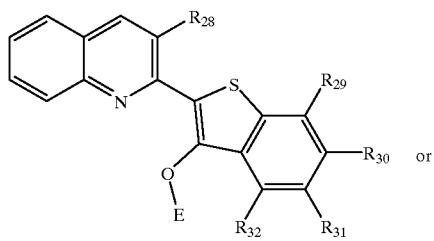
(XIVa)
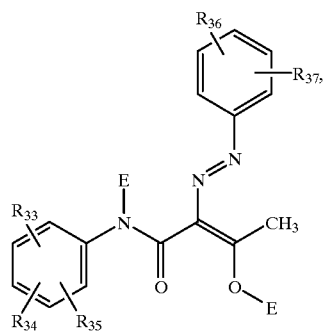
(XIVb)
in which $R_{28}$ is H or O—E,
$R_{29}$, $R_{30}$, $R_{31}$ and $R_{32}$ independently of one another are hydrogen, halogen, —COO—$C_1$–$C_6$alkyl or —CONE—$C_1$–$C_6$alkyl,
j) azo compounds of the formula
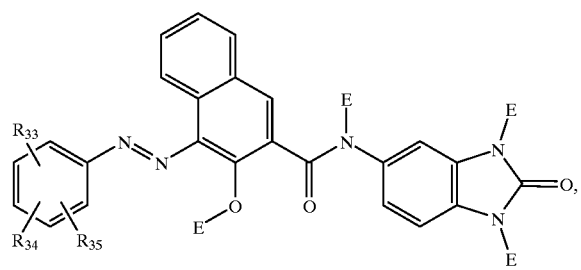
(XVa)
(XVb)
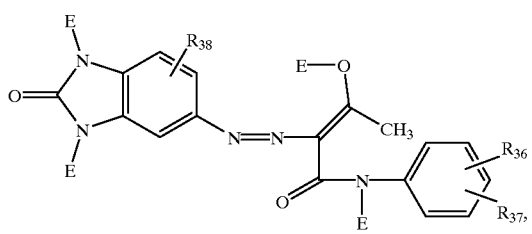
(XVc)
(XVd)
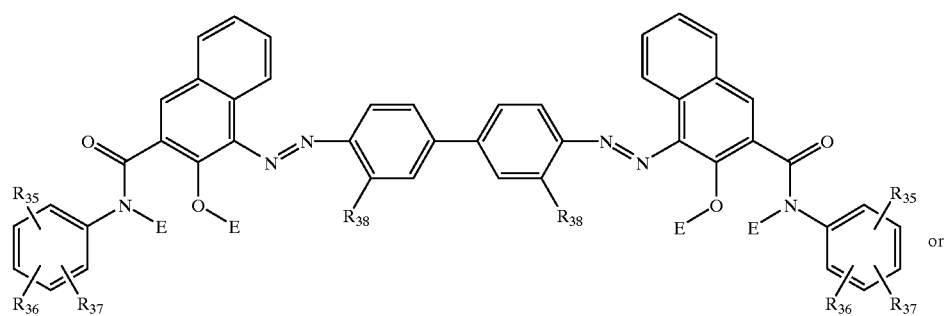
(XVe)
or -continued (XVf)

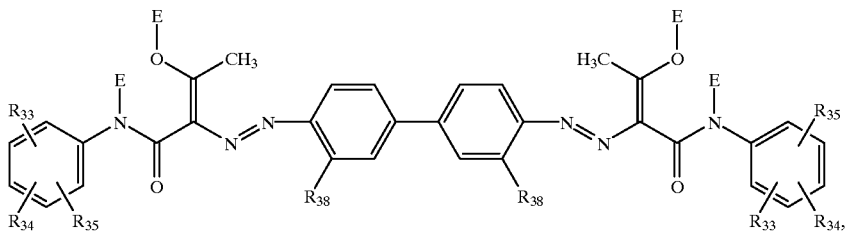

in which $R_{33}$, $R_{34}$, $R_{35}$ $R_{36}$ and $R_{37}$ independently of one another are hydrogen, halogen, $C_1$–$C_6$alkyl, $C_1$–$C_6$alkoxy, nitro, acetyl or $SO_2NEC_1$–$C_6$alkyl, and $R_{38}$ is hydrogen, halogen, $C_1$–$C_6$alkyl or $C_1$–$C_6$alkoxy, k) anthraquinones of the formula (XVIa)

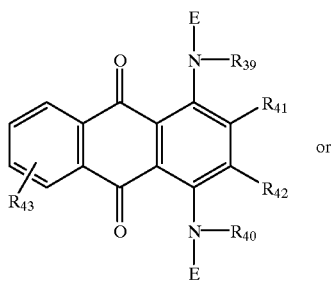

or (XVIb)

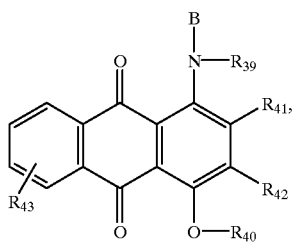

in which $R_{39}$ and $R_{40}$ independently of one another are hydrogen, $C_1$–$C_{12}$alkyl, or $C_6$–$C_{12}$aryl which is unsubstituted or substituted by halogen, $C_1$–$C_6$alkyl, $C_1$–$C_6$alkoxy, nitro, acetyl, $SO_2NEC_1$–$C_6$alkyl or $SO_2NE_2$, $R_{41}$ and $R_{42}$ independently of one another are hydrogen, halogen, $C_1$–$C_6$alkyl, $C_1$–$C_6$alkoxy, nitro, cyano, $CONE_2$, $SO_2NEC_1$–$C_6$alkyl, $SO_2NE_2$, $SO_3E$, $SO_3$ Na or $C_6$–$C_{12}$aryl which is unsubstituted or subtituted by halogen, $C_1$–$C_6$alkyl, $C_1$–$C_6$alkoxy, nitro, acetyl, $SO_2NEC_1$–$C_6$alkyl or $SO_2NE_2$, and $R_{43}$ is hydrogen, halogen, nitro, cyano, hydroxyl or $C_1$–$C_6$alkoxy, and l) indigo or leucoindigo derivatives of the formula (VIIIa)

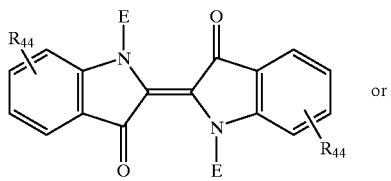

or

-continued (VIIIb)

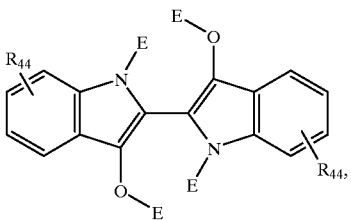

in which $R_{44}$ is hydrogen, CN, $C_1$–$C_6$alkyl, $C_1$–$C_6$alkoxy or halogen, where in each case in the above-mentioned formulae each E independently of the others is hydrogen or B, with the proviso that in each formula E is B on at least one occasion, and B is as defined above.

9. A porous sintered material according to claim 6 in which —L is a group of the formula

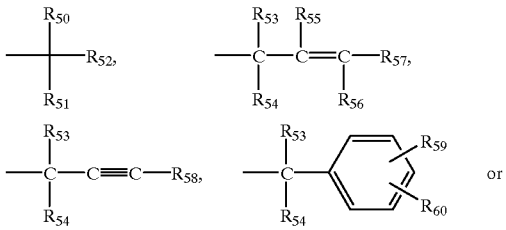

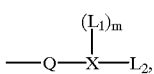

in which $R_{50}$, $R_{51}$ and $R_{52}$ independently of one another are $C_1$–$C_6$alkyl, $R_{53}$ and $R_{54}$ independently of one another are $C_1$–$C_6$alkyl, O, S or $N(R_{61})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{55}$, $R_{56}$ and $R_{57}$ independently of one another are hydrogen or $C_1$–$C_6$alkyl, $R_{58}$ is hydrogen, $C_1$–$C_6$alkyl or a group of the formula

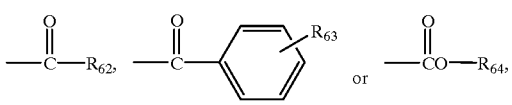

$R_{59}$ and $R_{60}$ independently of one another are hydrogen, $C_1$–$C_6$alkyl, $C_1$–$C_6$alkoxy, halogen, cyano, nitro, $N(R_{61})_2$, unsubstituted or halo-, cyano-, nitro-, $C_1$–$C_6$alkyl- or $C_1$–$C_6$alkoxy-substituted phenyl, $R_{61}$ and $R_{62}$ are $C_1$–$C_6$alkyl, $R_{63}$ is hydrogen or $C_1$–$C_6$alkyl and $R_{64}$ is hydrogen, $C_1$–$C_6$alkyl, uncubstituted or $C_1$–$C_6$alkyl-substituted phenyl, Q is p,q-$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1$–$C_{12}$alkoxy-, —$C_1$–$C_{12}$alkylthio-, —$C_2$–$C_{24}$dialkylamino-, —$C_6$–$C_{12}$aryloxy-, —$C_6$–$C_{12}$arylthio-, —$C_7$–$C_{24}$alkylarylamino- or —$C_{12}$–$C_{24}$diarylamino-substituted $C_1$–$C_6$alkyl or (-(p', q'-$C_2$–$C_6$alkylene)-Z-)$_n$—$C_1$–$C_6$alkyl, where n is a number from 1 to 1000, p' and q' are different numeric locants, each Z independently of the others is a heteroatom O, S or $C_1$–$C_{12}$alkyl-substituted N, and $C_2$–$C_6$alkylene in the repeating units (—$C_2$–$C_6$alkylene-Z-) can be identical or different, and $L_1$ and $L_2$ can be saturated or mono- to deca-unsaturated, uninterrupted or interrupted in any desired points by from 1 to 10 groups selected from the group consisting of —(C═O)— and —$C_6H_4$—, and may carry no or 1 to 10 further substituents selected from the group consisting of halogen, cyano and nitro.

\* \* \* \* \*